US008684621B2

(12) United States Patent
Forthaus et al.

(10) Patent No.: US 8,684,621 B2
(45) Date of Patent: Apr. 1, 2014

(54) BALL JOINT

(75) Inventors: Uwe Forthaus, Duesseldorf (DE); Alexander Paul, Kempen (DE); Ulrich Mette, Essen (DE); Harald Walter, Duisburg (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 13/381,681

(22) PCT Filed: Jun. 24, 2010

(86) PCT No.: PCT/DE2010/000725
§ 371 (c)(1),
(2), (4) Date: Mar. 23, 2012

(87) PCT Pub. No.: WO2011/000352
PCT Pub. Date: Jan. 6, 2011

(65) Prior Publication Data
US 2012/0170969 A1    Jul. 5, 2012

(30) Foreign Application Priority Data

| Jun. 30, 2009 | (DE) | 10 2009 031 283 |
| Jun. 30, 2009 | (DE) | 10 2009 031 284 |
| Jun. 30, 2009 | (DE) | 10 2009 031 289 |
| Jun. 30, 2009 | (DE) | 10 2009 031 290 |
| Jun. 30, 2009 | (DE) | 10 2009 031 738 |

(51) Int. Cl.
*F16C 7/00*    (2006.01)
(52) U.S. Cl.
USPC .......................................... 403/135; 403/134

(58) Field of Classification Search
USPC ............. 403/74, 90, 122, 134, 135, 143, 270, 403/271, 248, 250, 251
See application file for complete search history.

(56) References Cited

U.S. PATENT DOCUMENTS 4,758,110 A * 7/1988 Ito .................................. 403/140
4,954,006 A * 9/1990 Suzuki et al. ................. 403/135
(Continued)

FOREIGN PATENT DOCUMENTS

| DE | 2539698 A1 | 3/1977 |
| DE | 19823781 A1 | 12/1999 |

(Continued)

OTHER PUBLICATIONS

Search Report for DE 10 2009 031 289.7 dated Jun. 23, 2010.

(Continued)

*Primary Examiner* — Joshua Kennedy
(74) *Attorney, Agent, or Firm* — MacMillan, Sobanski & Todd, LLC

(57)    ABSTRACT

A ball joint includes a joint housing having a recess, a ball stud having a ball head, a sealing bellows having a sealing seat on the housing side and a sealing seat on the stud side in the form of a bellows mouth which is adapted to be brought into contact with the ball stud, a bellows body of the sealing bellows extending between the sealing seat on the housing side and the bellows mouth, and further includes a joint socket, the ball head being accommodated for swiveling motion within the joint socket, and the joint socket being inserted in the recess of the joint housing.

44 Claims, 24 Drawing Sheets

(56) References Cited

U.S. PATENT DOCUMENTS

| | | | | |
|---|---|---|---|---|
| 5,265,495 | A | * | 11/1993 | Bung et al. .................. 74/502.6 |
| 5,352,059 | A | | 10/1994 | Ueno et al. |
| 5,427,467 | A | * | 6/1995 | Sugiura ........................ 403/140 |
| 5,489,161 | A | * | 2/1996 | Sugita et al. .................. 403/134 |
| 5,611,635 | A | * | 3/1997 | Schutt et al. .................. 403/141 |
| 5,676,485 | A | * | 10/1997 | Lee ............................... 403/135 |
| 5,876,148 | A | * | 3/1999 | Kraps .......................... 403/119 |
| 6,190,080 | B1 | * | 2/2001 | Lee ............................... 403/135 |
| 6,692,176 | B1 | * | 2/2004 | Fladhammer .................. 403/2 |
| 6,748,820 | B2 | * | 6/2004 | Ruhlander .................. 74/502.4 |
| 7,004,665 | B2 | * | 2/2006 | Wasylewski et al. ......... 403/135 |
| 7,044,018 | B2 | * | 5/2006 | Sanchez et al. ............. 74/502.4 |
| 7,056,125 | B2 | * | 6/2006 | Melis et al. .................. 439/8 |
| 7,134,801 | B2 | * | 11/2006 | Kuroda ........................ 403/135 |
| 8,376,647 | B2 | * | 2/2013 | Kuroda ........................ 403/134 |
| 2011/0170944 | A1 | * | 7/2011 | Oellers ........................ 403/122 |

FOREIGN PATENT DOCUMENTS

| | | |
|---|---|---|
| DE | 19900072 A1 | 8/2000 |
| DE | 10014603 A1 | 10/2001 |
| DE | 19850423 C2 | 8/2003 |
| DE | 10207779 C1 | 10/2003 |
| EP | 0272403 A1 | 6/1988 |
| EP | 0775841 A1 | 5/1997 |
| EP | 1052418 A2 | 11/2000 |
| EP | 1733861 A2 | 12/2006 |
| WO | 2007115515 A1 | 10/2007 |
| WO | 2008000231 A1 | 1/2008 |

OTHER PUBLICATIONS

Künne,B.:Köhler/Rögnitz. Maschinenteile 1, 10.Aufl.,Wiesbaden. B.G. Teubner,2007,S.24. •SBN 978-3-8351-0093-0 Abb. 12.

* cited by examiner

BALL JOINT

CROSS-REFERENCE TO RELATED APPLICATIONS

This application is a national stage of International Application No. PCT/DE2010/000725 filed Jun. 24, 2010, the disclosures of which are incorporated herein by reference, and which claimed priority to German Patent Application No. 10 2009 031 738.4 filed Jun. 30, 2009, German Patent Application No. 10 2009 031 289.7 filed Jun. 30, 2009, German Patent Application No. 10 2009 031 290.0 filed Jun. 30, 2009, German Patent Application No. 10 2009 031 283.8 filed Jun. 30, 2009, and German Patent Application No. 10 2009 031 284.6 filed Jun. 30, 2009, the disclosures of which are incorporated herein by reference in their entirety.

BACKGROUND OF THE INVENTION

The present invention relates to a ball joint which is in particular suitable for use in the chassis area of a motor vehicle.

Numerous ball joints for motor vehicles are known from the prior art. Such ball joints typically consist of a ball stud which is movably supported in a joint socket made from plastic, a housing, and a sealing system that protects from the ingress of dirt and prevents the leakage of lubricant. The ball stud and the joint socket are inserted into the housing in the axial direction and mechanically connected with the housing. Due to the axial mounting force, the plastic socket is pre-stressed axially and/or radially in the housing, which is necessary for the joint function. In this way, customer-specified motion moments, spring excursions and specified elasticities can be complied with.

The ball joint socket is in most cases mechanically connected to the housing by reshaping a housing edge (e.g., roller-burnishing a rolled edge). This rolled edge is either molded directly onto the joint socket or onto a closure cap or lock ring which enhances the sealing action and increases the mechanical separating force of the socket from the housing. This socket joining and joint closure technique has been well-proven for many years. However, this technology is subject to the disadvantage that a machining of the housings is required. In addition, the closure method requires a special roller-burnishing machine, in conjunction with a corresponding assembly time for the roller-burnishing. A ball joint in which the rolled edge of the closure cap is roller-burnished is illustrated in FIG. 25.

Ball joints for motor vehicles are protected against an ingress of dirt and moisture and against a leakage of joint grease by means of a sealing bellows or a sealing sleeve. Two sealing regions are involved here: firstly at the connection between the sealing bellows and the housing (interference fit of the sealing bellows), referred to as "seal on the housing side" below, and secondly at the connection between the sealing bellows and the ball stud (where the bellows rotationally moves on the ball stud), referred to as "seal on the stud side" below. In today's typical applications, clamping rings are used on both sides to fasten the sealing bellows to the housing and to the ball stud; by means of the clamping rings, the required sealing action between the sealing bellows and the housing or the ball stud is achieved. This combination is disadvantageous because of the comparatively high manufacturing costs.

The connection of a sealing bellows with the housing is nowadays effected on a standard basis by means of a bellows groove applied on the housing, in which the sealing bellows is positioned conforming to the contour thereof. Such a connection is disclosed, e.g., in DE 199 00 072 C2 and is shown in a cross-sectional view in FIG. 26. The contact pressure that is required for the sealing performance is applied by a clamping means (normally a clamping ring) in order to satisfy customer-specified sealing tests. The connection of the sealing bellows shown in FIG. 26 involves additional costs because of the necessary clamping ring and its installation.

As an alternative to the connection according to FIG. 26, further principles are known in the prior art, which can be used for positioning the sealing bellows on the ball stud and on the housing. FIG. 27 shows a solution with clamping rings integrated in the sealing bellows, which produce an interference fit of the sealing bellows on the housing and a sealing seat on the ball stud. FIG. 28 shows a solution with a metal ring applied to the outside of the sealing bellows, the metal ring being connected with the housing with a force fit by a reshaping process. Finally, FIG. 29 shows a solution with a seal on the housing side without a clamping means, in which the sealing bellows is clamped between the joint socket and the housing. But here no interlocking or force-fitting connection is provided between the sealing bellows and the joint socket, so that a preassembly of the sealing bellows and the joint socket is not possible.

The connection on the stud side of a sealing bellows to the ball stud is effected conventionally by means of a lower edge of the sealing bellows, referred to as bellows mouth, which is positioned in a round or rectangularly shaped bellows groove on the ball stud. FIG. 30 and FIG. 31 show a round and, respectively, rectangularly shaped bellows groove of a ball stud in a partial cross-sectional view, the bellows mouth being shaped in conformity with the contour of the bellows groove. It is further known that the bellows groove can be formed between a ball stud collar edge and the installation counter body, as shown in the cross-sectional view of FIG. 32.

The contact pressure that is required for the sealing performance of the sealing bellows is applied, for one thing, by a press fit assisted by a clamping means (usually a clamping ring, cf. FIGS. 30 to 32). A disadvantage here is that costs are incurred for the clamping ring and also its installation. Alternatively to this, stud-side seals without clamping means are also known, as shown in FIG. 33. Such systems, however, are subject to the disadvantages that in the case of a strong press fit, they may lead to the bellows being twisted upon rotation and to a subsequent bellows destruction or, in the case of a press fit of lower strength, they result in an inadequate sealing performance.

FIGS. 34 to 36 illustrate further ball joints according to the prior art. FIG. 34 shows a ball joint for a stabilizer strut made from GFRP, in which a joint socket in the form of a plastic material cup is connected with the GFRP housing by a substance-to-substance bond by means of ultrasonic welding. Furthermore, joint sockets in the form of plastic material cups are known which are fastened in the housing exclusively by suitable snap hooks (FIG. 35) or in which an additional clip is mechanically locked in place with the snap hooks (FIG. 36). The plastic material cup shown in FIG. 35 is disclosed, e.g., in DE 198 23 781 C5. The plastic material cup shown in FIG. 36 is disclosed, e.g., in U.S. Pat. No. 5,676,485.

Joint devices, in particular ball joints, can be mechanically connected with each other by a strut body. Here, a respective ball joint is fitted to each of both ends of such a strut body, whereby an articulation between two points is obtained in a chassis suspension of a motor vehicle, for example. Stabilizer struts which constitute a connection between the stabilizer and the wheel suspension are typical applications. Such struts are subjected to tensile and compressive loads and consist mainly of steel rods with joint housings welded thereto, forged or die cast aluminum bodies or plastics with glass-fiber reinforcement. The orientation of the ball joint studs and the load requirements are each customer-specific, an effort being made to achieve a minimization of costs and weight, accompanied by a maximum force transmission.

Conventional steel designs (FIG. 37) for the above-mentioned strut body are cost-intensive and consist of a solid bar material having a circular cross-section and a joint housing welded thereto. Due to mechanical machining, the welding process and the coating, they require a high vertical range of manufacture. Further disadvantages of such steel struts are a limited shape forming and a relatively high weight.

Also known in the prior art are strut bodies made from a plastic material (FIG. 38), which are cost-effective and may be shaped freely within the bounds of production limitations (e.g., removal from the mold). The basic material is more light-weight and the entire structure may be adjusted to the load requirements (tensile/compressive load). Of a disadvantage are a distinctly higher installation space requirement (diameter of the cross-sectional profile), lower structural rigidity, and a strong influence on the structural strength by high or low temperatures.

Further known are strut bodies made of aluminum, which have production limitations and options comparable to those of the plastic material struts. The advantages include the low weight and the structural strength that is uninfluenced within the range of the operating temperatures. The structural rigidity is clearly above the level of plastic materials, but does not reach the values of a steel design.

BRIEF SUMMARY OF THE INVENTION

It is a feature of the invention to provide a ball joint which can be manufactured at low cost while the assembly time is reduced, and which ensures a high operational reliability.

This feature is achieved by a bearing device having the features of the first claim. Advantageous further developments of the invention are the subject matters of the dependent claims.

A ball joint according to the invention includes a joint housing having a recess, a ball stud having a ball head, and a sealing bellows having a sealing seat on the housing side and a sealing seat on the stud side in the form of a bellows mouth which is adapted to be brought into contact with the ball stud, a bellows body of the sealing bellows extending between the sealing seat on the housing side and the bellows mouth. The ball joint further includes a joint socket, the ball head being accommodated for swiveling motion within the joint socket, and the joint socket being inserted in the recess of the joint housing. Such a ball joint is of a modular structure; it can be fully assembled in a few steps.

In an advantageous further development of the invention, provision may be made for at least one locking member on an outside of the joint socket opposite to the ball head, the locking member cooperating with a rim of the recess of the joint housing. Further provided is a retaining member which in the assembled condition of the ball joint is in contact with an inner circumferential surface of the locking member, so that the locking member is thereby held in engagement with the rim of the recess of the joint housing and the joint socket is thus captively secured in the recess of the joint housing. The retaining member is connected with or attached to the joint socket in the pole portion thereof.

The retaining member constitutes a retaining clip which is connected to the joint socket with an interlocking fit and/or by a substance-to-substance bond. This connection of the retaining member with the joint socket ensures that the at least one locking member is operationally reliably held in engagement with the rim of the recess of the joint housing, so that an unintentional detachment of the joint socket from the joint housing of the ball joint is not possible. The connection of the retaining member with the joint socket in the pole portion thereof allows any tolerances of the locking member, which might otherwise lead to the retaining member being released from the locking member, to be compensated for. A further advantage of the connection of the retaining member with the joint socket resides in a marked increase in the separating forces of the joint socket from the joint housing.

In an advantageous further development of the invention, the joint socket may be manufactured from plastic in one piece. This leads to low manufacturing costs and allows a high degree of integration, the locking member being adapted to be injection molded to the joint socket.

In an advantageous further development of the invention, the joint socket may have a closed shell surface, in particular in its pole portion, in which the joint socket is connected with the retaining member. The closed shell surface has an advantageous effect on the tightness of the joint socket in its pole portion. When the ball joint is assembled, an attachment of the ball head of a ball stud into the joint socket is ensured by the elastic properties thereof.

In an advantageous further development of the invention, the joint socket may include a projecting fastening pin in the pole portion, the fastening pin being adapted to be brought into engagement with a recess of the retaining member. The cooperation of this fastening pin with the recess ensures a central seat of the retaining member in the pole portion of the joint socket at all times and significantly facilitates the assembly process for a ball joint.

In an advantageous further development of the invention, the fastening pin may be formed as a snap hook which is locked with the recess of the retaining member in the assembled state of the ball joint. The retaining member is formed with a corresponding negative contour in relation to the snap hook. The snap hook locks the retaining member in the form of the clip in its position, with the clip, by its outer edge, bracing the at least one locking member of the joint socket in its housing mounting position to the rim of the recess of the joint socket. The configuration of the fastening pin as a snap hook is advantageous inasmuch as no further finishing is required after the locking with the retaining member.

In an advantageous alternative embodiment of the invention, the fastening pin, after a mounting of the retaining member, can be reshaped on its free end such that the retaining member is secured in position with an interlocking fit. In doing so, first the retaining member is guided by its recess over the fastening pin, a subsequent hot or cold forming of the free end of the fastening pin securing the retaining member in its position with an interlocking fit. The fastening pin may be expediently formed as a hollow cylinder here, which facilitates the reshaping of its free end. Additionally and/or alternatively, the fastening pin may also be connected with the recess of the retaining member by a substance-to-substance bond. This substance-to-substance bond may be produced, for example, by means of ultrasonic welding or adhesive bonding. In addition, it is possible to connect the outer edge of the retaining member with an inner circumferential surface of the locking member by a substance-to-substance bond; the ultrasonic welding or adhesive bonding are suitable for this purpose as well.

In an advantageous further development of the invention, the retaining member may be formed as a pole cap the contour of which is adapted to the pole portion of the joint socket. For one thing, this facilitates the process of mounting the retaining member with the joint socket; for another thing, this ensures a uniform cooperation or support of a plurality of locking members which may be arranged along the circumference of the joint socket.

The advantages of the above-mentioned variants of the ball joint are:

no mechanical machining of the joint housing is required;

substantial simplification of the assembly process since a reshaping of the joint housing is dispensed with and the assembly time can be reduced;

no change in the protection from corrosion as caused by reshaping processes (for example chipping of surface coatings);

installation of the joint socket into different housing materials is possible (for example steel, GFRP, aluminum); and fulfillment of customer-specified requirements specifications with regard to sealing action, joint functions and mechanical strengths and separating forces.

In an advantageous further development of the invention, the joint socket may include a holding flange, the sealing bellows being fastened to this holding flange. This offers the advantage of forming a subassembly, consisting of the joint socket and the sealing bellows, prior to installation of the joint socket into the joint housing. This subassembly is expediently produced in that the sealing bellows is fastened to the holding flange of the joint socket with an interlocking fit and/or a force fit. This fastening of the sealing bellows to the holding flange makes the assembly process for manufacturing the ball joint considerably simpler and more inexpensive since the above-mentioned subassembly can already be prepared beforehand and thereby includes a separate handling or a complicated mounting process with respect to the joint socket and the sealing bellows.

In an advantageous further development of the invention, the holding flange may be formed in a radially surrounding manner. This ensures a very reliable connection of the sealing bellows to the holding flange. As an alternative, it is also possible to form the holding flange in a plurality of segments separated from each other, whereby the elasticity of the joint socket and, hence, the attachment of the ball head of the ball stud is facilitated.

In an advantageous further development of the invention, a raised portion may be formed on the holding flange and a recess may be formed in an edge portion of the sealing bellows, the recess of the sealing bellows and the raised portion of the holding flange being linked with each other. In particular when the raised portion includes an undercut, an interlocking connection is provided between the sealing bellows and the holding flange by the above-mentioned linking of the recess with the raised portion. The undercut of the raised portion may expediently have a spherical, crowned or angled shape. Since the sealing bellows is usually produced from a rubber-elastic material, it is easily possible to bring the recess of the sealing bellows into engagement with the raised portion of the holding flange.

In an advantageous further development of the invention, the raised portion may be formed in segments in the same way as and in conformity with the holding flange. This offers advantages for the producibility of the joint socket owing to a better and simpler removability from the mold, in particular when the raised portion includes an undercut. Deviating from this, it is also possible that solely the raised portion is formed in segment-like portions, as a result of which a simplified removability from the mold is ensured in the same way.

Additionally or alternatively to the above-mentioned interlocking connection, it is further possible to connect the sealing bellows with the holding flange with an interlocking fit or by a substance-to-substance bond. This may be realized in a suitable manner by using an adhesive and/or by producing a substance-to-substance bond.

In an advantageous further development of the invention, the sealing bellows may include a contact surface on a side opposite to the recess, the contact surface having a sealing rib structure formed thereon. In the fully assembled state of the ball joint, this contact surface of the sealing bellows is pressed against a housing surface, which results in an excellent joint sealing on the housing side of the assembled ball joint.

The advantages of the above-mentioned variants of the ball joint using the subassembly are:

interlocking and/or force-fitting connection between the sealing bellows and the joint socket, which allows the formation of a preassembled subassembly;

an additional clamping means on the housing side is dispensed with;

fulfillment of the sealing conditions of customer-specified requirements specifications; and cost reduction compared with conventional sealing systems.

In an advantageous further development of the invention, the bellows mouth can be brought into sealing contact with the ball stud with a substantially constant contact pressure in different angular positions of the ball stud with respect to a longitudinal axis of the ball joint. This prevents an inadmissible lifting off of the bellows mouth from the ball stud and thus an ingress of moisture, dirt or the like. A further advantage consists in that a sufficient contact pressure, with which the sealing seat on the stud side of the sealing bellows is pressed against the ball stud, is ensured even when no clamping means is provided for the sealing bellows. As a result, an otherwise commonly used clamping ring on the stud side may be dispensed with. Furthermore, a reliable positioning of the bellows mouth on the ball stud or in a groove thereof is made sure at all times, namely both during assembly of the ball joint and also in operation thereof, when the ball stud executes swiveling motions in relation to a longitudinal axis of the ball joint and/or is rotationally rotated.

In an advantageous further development of the invention, the contact surface of the bellows mouth has a concave shape in the unloaded condition, so that when the ball joint is in the assembled state, a resilient contact engagement of the bellows mouth with the ball stud is produced. In the case of large movement or swivel angles of the ball stud, compression and decompression effects of the bellows mouth press fit will occur as a result of tensile and compressive forces within the bellows body. The above-mentioned spring action of the contact surface of the bellows mouth counteracts these disturbances in a compensating manner so that, in comparison with a standard bellows mouth, a contact pressure and sealing performance are ensured over a larger range of force.

In an advantageous further development of the invention, the bellows body may have an axial wiper lip in a region opposite to the contact surface with the ball stud. As a first approximation, such a wiper lip prevents the ingress of dirt and moisture into the interior of the ball joint.

In an advantageous further development of the invention, the bellows body and the bellows mouth are connected with each other in such a way that a force and motion transmission between these two elements is at least reduced. This results in that a force or a movement is transmitted from the bellows body to the bellows mouth to an at least reduced extent. Such a connection between the bellows body and the bellows mouth may expediently be provided in that the bellows body is fitted to the bellows mouth essentially in the region of the axial center thereof. When a tensile force occurs in the bellows body, this leads to a reduced force in the bellows mouth and thus to a uniform reduction in the contact pressure of the bellows mouth over its axial height, without the occurrence of a one-sided detachment of the bellows mouth from the ball stud, even in the case of large angles of movement or swivel of the ball stud.

In an advantageous further development of the invention, a transition region between the bellows body and the bellows mouth may have a reduced cross-section. The reduction in the force and motion transmission between the bellows body and the bellows mouth is achieved hereby. The same effect can be achieved in that the bellows body has at least one indentation. Such an indentation fulfils the function of a groove and also reduces the transmission of force and motion of the bellows body to the bellows mouth. In other words, as a consequence of this the tensile forces that are generated by a movement of the bellows body are transmitted to the bellows mouth only to a reduced degree, so that the contact pressure with which the bellows mouth is pressed against the ball stud remains evenly distributed over the bellows mouth height. The effect of such an indentation is further improved in that it is formed in the bellows body on both sides. A still further improvement is obtained in that the bellows body has a plurality of indentations which are provided one behind the other or adjacent to each other in the nature of a series connection. The desired reduction in the force and motion transmission of the bellows mouth to the bellows body is still further improved hereby.

In a more advantageous further development of the invention, the at least one indentation may be provided radially outside of the reduction of cross-section between the bellows mouth and the bellows body. This advantageously leads to an overlap of the effect of the indentation and of the reduction of cross-section and, thus, as a result, to a further improved reduction in the force and motion transmission between the bellows body and the bellows mouth.

In an advantageous further development of the invention, the bellows body may include at least one radial fold. This should be understood to the effect that in the axial direction the bellows body includes a plurality of segments having different diameters. In the case of swivel or tilting motions of the ball stud about its longitudinal axis, this has the advantage that the bellows body has sufficient "reserves", so that the tensile stresses acting on the bellows mouth do not exceed a specific degree. Alternatively and/or additionally, the bellows body may also include at least one axial fold. This should be understood to the effect that in the radial direction the bellows body includes a plurality of segments having different axial heights. The effect of such an axial fold is the same as with the aforementioned radial fold, namely a reduction in the tensile stress acting on the bellows mouth.

The advantages of the above-mentioned variants of the ball joint using the sealing bellows are:

an almost constant contact pressure of the bellows mouth on the ball stud, even in the case of large angles of movement of the ball joint;

the sealing between the bellows mouth and the ball stud is ensured even without a clamping ring;

a reliable positioning of the bellows mouth in a ball stud groove, namely both during an assembly of the ball joint and in operation thereof, particularly in the case of large joint movements;

decrease in costs compared with conventional sealing bellows systems.

The ball joint according to the invention may be mechanically connected with a further ball joint by a strut body. Thus, these two ball joints constitute a system consisting of two ball joints. The afore-mentioned strut body has a profile cross-section which is arranged within an enveloping circle and has a vertical axis and a horizontal axis, a first number of raised portions being formed within the horizontal axis and a second number of raised portions being formed below the horizontal axis. Here, the first number of raised portions is greater than the second number of raised portions. A strut body of such type brings about an optimum relationship between structural rigidity and minimum weight, based on a small cross-sectional profile diameter and a maximum force transmission in the longitudinal direction of the rod without a plastic deformation. Furthermore, such a strut body can be produced simply and at low cost owing to a low vertical range of manufacture, with no finishing machining being required. Moreover, such a strut body distinguishes itself by an excellent static and dynamic structural rigidity at all operating temperatures. In this respect, such a strut body provides a reliable mechanical connection between two points, which may, e.g., each be formed from a joint device in the form of a ball joint.

In an advantageous further development of the invention, the strut body may include three raised portions above its horizontal axis and two raised portions below its horizontal axis. This ensures the above-mentioned compact cross-sectional profile diameter, accompanied by an excellent strength. Alternatively to this, it is also possible that more or less than three raised portions are formed above the horizontal axis. The same also applies to the region below the horizontal axis, in which more or less than two raised portions may be formed.

In an advantageous further development of the invention, the profile cross-section of the strut body may be made to be symmetrical with respect to its vertical axis. This has an advantageous effect on the properties relating to structural mechanics.

In an advantageous further development of the invention, the profile cross-section of the strut body may be made to be substantially constant along its length. Depending on the respective purpose of use, this may completely satisfy the loads occurring, with the manufacturing process being simplified owing to the constant cross-section. As an alternative, the profile cross-section may also be made to vary along a longitudinal extent of the strut body, so that a curvature of the strut body owing to the variable bending moment curve upon a compressive loading and, accordingly, the pressure resistance with respect to buckling is optimized. Furthermore, the strut body may have different portions along its length which have a constant profile cross-section and also a variable profile cross-section. This offers advantages with respect to the optimization of the mechanical properties of the strut body for a specific loading condition.

In an advantageous further development of the invention, the center of area of the strut body with respect to its position in relation to the horizontal axis may be constant or else may be variable. By a variation in position of the center of area in relation to the horizontal axis, the bending line of the strut body upon a compressive loading can be designed in an optimum fashion.

On the basis of the various raised portions of the strut body which are provided within the enveloping circle, at least one so-called profile depression is obtained on the outer circumferential surface of the strut body. Such a profile depression may either have a closed configuration, as a result of which the manufacturing process is simplified. Alternatively, this profile depression may also be stiffened by ribs, which results in an enhanced structural rigidity of the strut body. In other words, the strut body may be provided with at least one rib on its outer circumferential surface and within the enveloping circle, the rib being preferably formed in the region of the profile depression.

In an advantageous further development of the invention, a transition region is provided on at least one free end of the strut body, the transition region constituting a connection region for a kinematic point. Such a kinematic point should be understood to the effect that a mounting or connection of a further component, e.g. a joint device in the form of a ball joint, an elastomer joint or the like, is possible hereby.

This transition region is conveniently designed in the form of a cylindrical portion, so that the angular position of this connection region may be decoupled from the profile cross-section of the strut body.

In an advantageous further development of the invention, both free ends of the strut body may each have a transition region in the form of a cylindrical portion formed thereon. Owing to the cylindrical shape of the two transition regions, the angular positions thereof relative to each other can be designed in a defined manner, taking into consideration the direction of removal of the strut profile from the mold, so that the connection regions on both ends of the strut body may include an angle between 0° and 180° relative to each other.

In an advantageous further development of the invention, the strut body may be manufactured in a die-casting method, for example aluminum die-casting. This allows a low-cost manufacture, inclusive of all geometric detail contours, without a mechanical finishing or coating being required. The die-casting method has the further advantage that the formation of air inclusions or shrinkage holes during the casting process can thereby be prevented or at least reduced.

In an advantageous further development of the invention, the strut body is made use of in particular in vehicle construction, particularly in chassis components, for example as a stabilizer strut or the like.

It will be appreciated that the features mentioned above and those still to be discussed below can not only be used in the respectively specified combination, but also in different combinations or by themselves, without leaving the scope of the present invention.

Other advantages of this invention will become apparent to those skilled in the art from the following detailed description of the preferred embodiments, when read in light of the accompanying drawings.

DETAILED DESCRIPTION OF THE INVENTION

Figure 1:
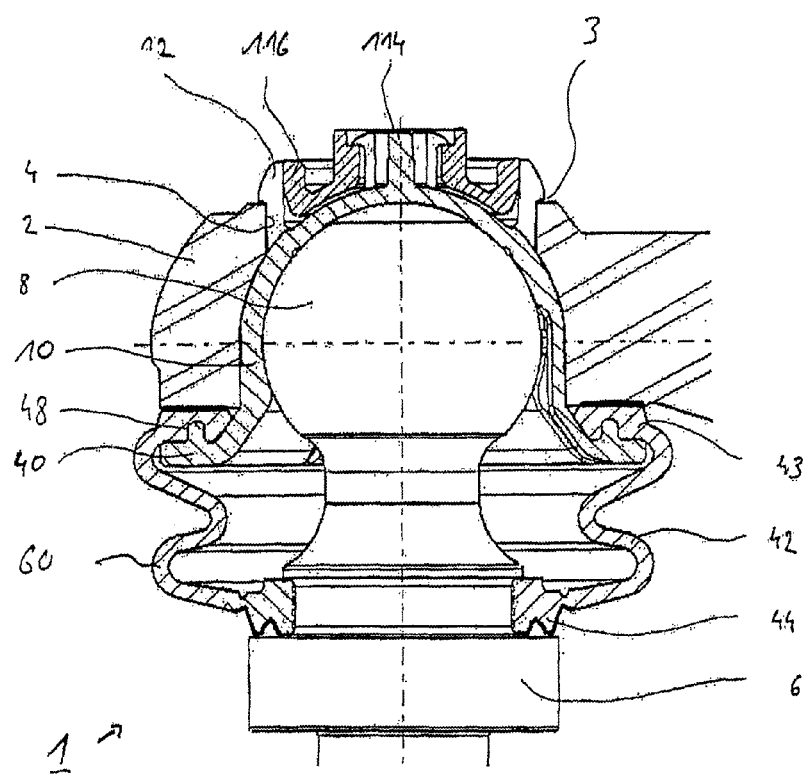
FIG. 1 shows a cross-sectional view of a ball joint according to the invention, in a fully assembled condition.

FIG. 1 shows a ball joint 1 according to the invention, in a fully assembled condition; its essential functional elements will be named and discussed in detail below.

The ball joint 1 comprises a housing 2 which includes a recess 4 in the form of a passage opening A ball head 8 of a ball stud 6 is locked in the recess 4 of the joint housing 2 by means of a joint socket 10. A captive positioning of the joint socket 10 within the recess 4 is ensured by suitable snap hooks 12 which are locked with a rim 3 of the recess 4.

For sealing the ball joint 1, provision is made for a sealing bellows 42 which suitably prevents the ingress of dirt or moisture into the interior of the ball joint 1. Similarly, the sealing bellows 42 excludes the leakage of lubricating grease or the like from the interior of the ball joint 1. The sealing bellows 42 is connected or linked to a holding flange 40 of the joint socket 10 by means of a recess 48 in the form of a groove formed on its upper edge 43. The lower edge of the sealing bellows 42 in the form of a bellows mouth is in sealing contact engagement with a bellows groove 20 of the ball stud 6.

Individual component parts of the ball joint 1 will be discussed in detail with reference to FIGS. 2 to 19 below. Like component parts, as compared with FIG. 1, are assigned like reference numbers herein which are each preceded by "100" or a multiple thereof.

Figure 2:
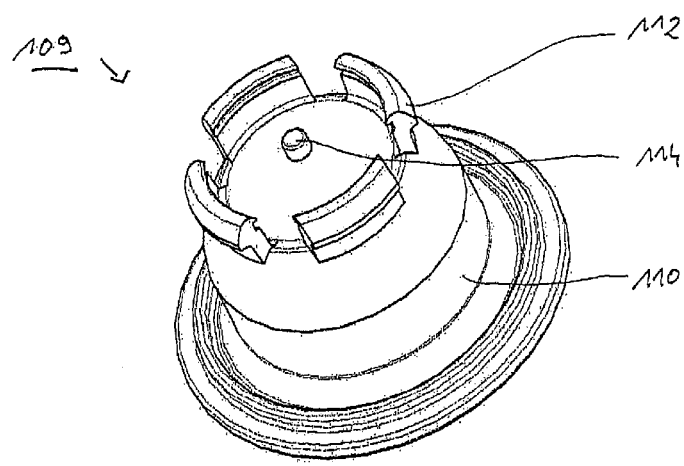
FIG. 2 shows a perspective view of a joint socket for the ball joint of FIG. 1.

FIG. 2 shows a bearing device 109 in a perspective view from above. The bearing device 109 comprises the joint socket 110, which is preferably made from a plastic material and has a closed shell surface in its pole portion. A plurality of locking members 112 in the form of snap hooks is arranged on the joint socket 110 on the edge portion of the pole portion. In the pole portion itself, the joint socket includes a projecting fastening pin 114 (shown in a simplified manner in FIG. 2), the function of which will be discussed further below.

Figure 3:
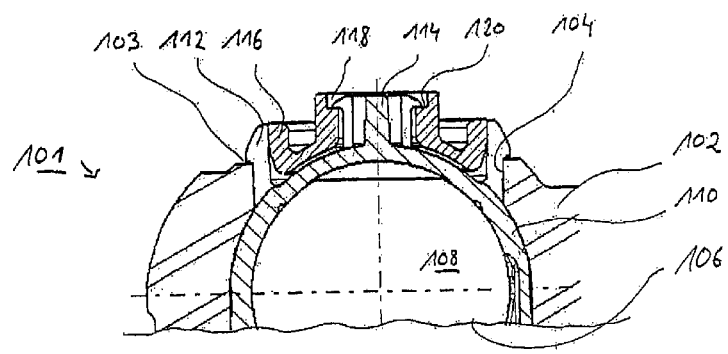
FIG. 3 shows a partial cross-sectional view of the joint socket of FIG. 2, in the assembled condition of the ball joint.

The bearing device 109 or the joint socket 110 serve to support a ball stud in a joint housing of a ball joint. FIG. 3 shows part of such a ball joint 101. The ball head 108 of the ball stud 106 is accommodated for swiveling motion in the joint socket 110, the joint socket being inserted in the recess 104 of the joint housing 102. In the assembled condition, the undercuts of the snap hooks 112 cooperate with a rim 103 of the recess 104, whereby the joint socket 110 is held within the recess 104.

The joint socket 110 is secured within the recess 104 of the joint housing 102 by a retaining member 116 which has a central recess 118. In the embodiment shown in FIG. 3, the fastening pin 114 is formed as a snap hook. When the retaining member 116 is placed on the pole portion, accessible from the outside, of the joint socket 110, the fastening pin 114 first passes through the recess 118 of the retaining member 116 before its undercuts suitably lock in place with a locking surface 120 that is provided within the recess 118. In this way, the retaining member 116 is connected with an interlocking fit with the joint socket 110 in the pole portion thereof. Here, the outside diameter of the retaining member 116 is suitably selected such that its outer edge rests against an inner circumferential surface of the respective snap hooks 112. When the retaining member 116 is in the mounted condition, this causes the snap hooks 112 to be prevented from moving radially inwards, which results in a secure press fit with the rim 103 of the recess 104. As a result, the joint socket 110 is thus effectively positioned within the recess 104 and secured against release.

Figure 4:
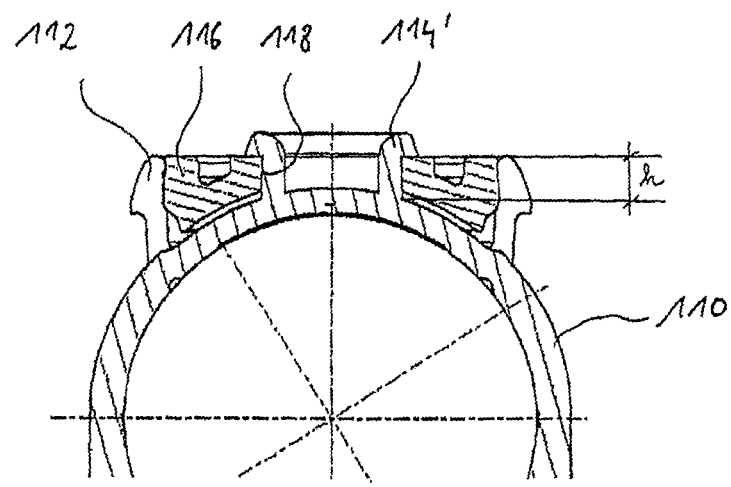
FIG. 4 shows a partial cross-sectional view of an alternative embodiment for a joint socket.

FIG. 4 shows a cross-sectional view of the joint socket 110 according to an alternative embodiment in which the fastening pin 114' is configured in a modified design in the form of a hollow cylinder. In the original state, this hollow cylinder has a constant diameter, its axial length being selected to be slightly greater than an axial height h of the recess 118 of the retaining member 116. When, during assembly of the ball joint 101, the retaining member 116 is placed on the pole portion of the joint socket 110, the free end of the hollow cylinder 114' initially protrudes from the recess 118. Subsequently, this free end is flanged outward by a hot or cold forming process, so that the retaining member 116 is held with an interlocking fit by the reshaped rim portion of the hollow cylinder 114'. The retaining function of the retaining member 116 in the form of the abutment of its outer edge against the inner circumferential surface of the snap hooks 112 corresponds to the embodiment of FIG. 3, so that reference is made thereto in order to avoid repetitions.

Figure 5:
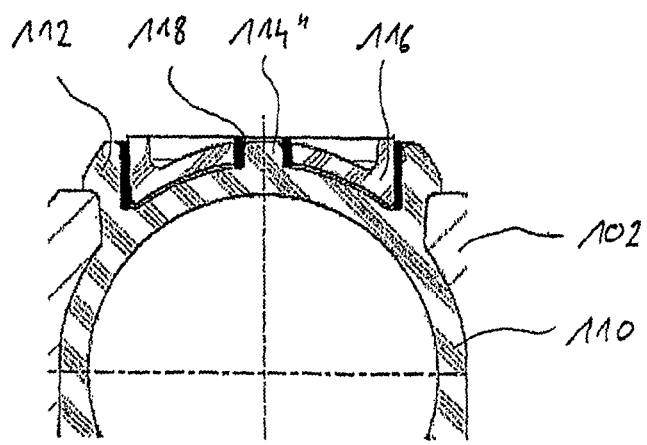
FIG. 5 shows a partial cross-sectional view of an alternative embodiment for a joint socket.

FIG. 5 shows a partial cross-sectional view of a further embodiment of the joint socket 110 in which the fastening pin 114" is configured in a modified design in the form of a truncated cylinder. When the ball joint 101 is assembled, the retaining member 116 is placed on the pole portion of the joint socket 110, with the truncated cylinder 114" moving into engagement with the recess 118. The retaining member 116 is attached onto the pole portion of the joint socket 110 by a substance-to-substance bond of the truncated cylinder 114" with the inner circumferential surface of the recess 118. This can be effected by means of ultrasonic welding or adhesive bonding, for example. The contact area of this substance-to-substance bond between the truncated cylinder 114" and the inner circumferential surface of the recess 118 is indicated by thick black lines in FIG. 5.

The connection of the retaining member 116 with the joint socket 110 can be further improved in that the outer edge of the retaining member 116 is connected with an inner circumferential surface of the snap hooks 112 by a substance-to-substance bond. Ultrasonic welding or adhesive bonding, for example, are suitable for this purpose as well. As regards the embodiments according to FIG. 4 and also FIG. 3, it will be appreciated that a substance-to-substance connection of the outer edge of the retaining member 116 with the inner circumferential surface of the snap hooks 112 is likewise possible herein, as a result of which the connection between the retaining member 116 and the joint socket 110 or the bearing device 109 is further improved.

It will be appreciated that a bearing device 109 according to the embodiments according to FIG. 4 or FIG. 5 may also be made use of for the ball joint 1 shown in FIG. 1.

Figure 6:
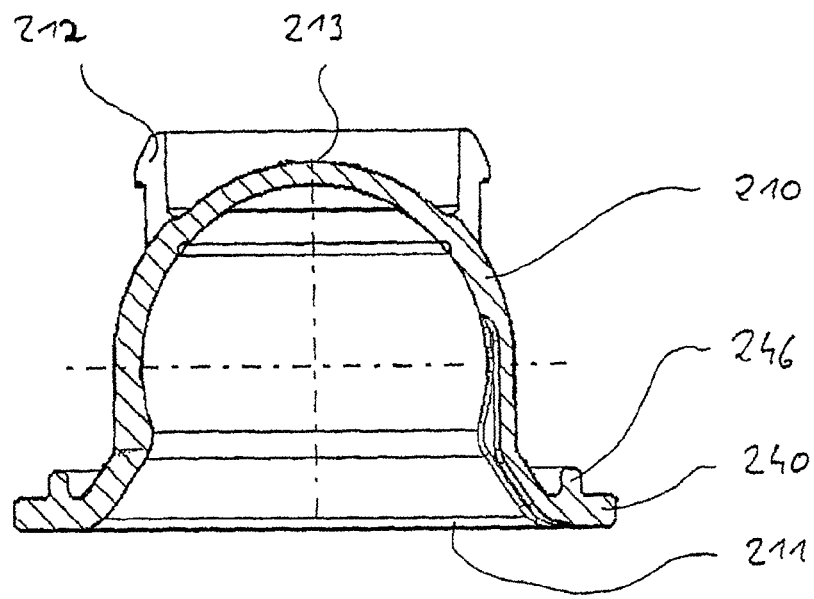
FIG. 6 shows a cross-sectional view of the joint socket of FIG. 2.

FIG. 6 shows a cross-sectional view of the joint socket 210 which has an opening 211 and a pole cap portion 213 having a closed shell surface. Adjacent to the pole cap portion 213, a plurality of locking members 212 in the form of snap hooks is fitted to the joint socket 210. Adjacent to its opening 211, the joint socket 210 comprises a holding flange 240 which expediently is of a radially surrounding configuration. A web-like raised portion 246 is formed in an edge portion of this holding flange 240.

Figure 7:
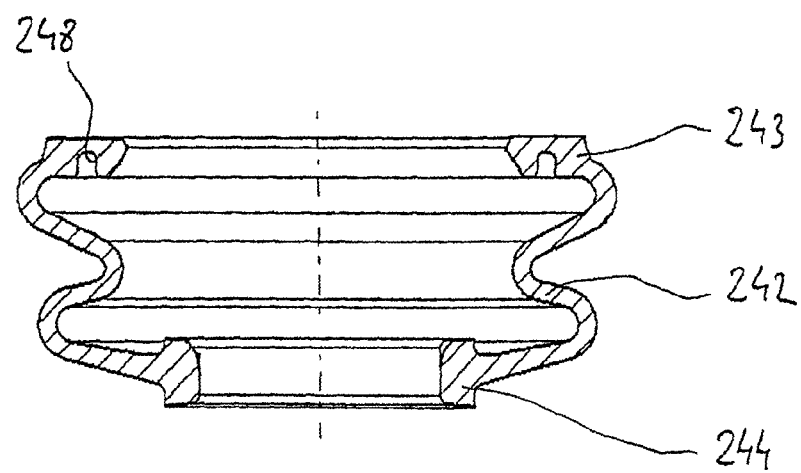
FIG. 7 shows a cross-sectional view of a sealing bellows.

FIG. 7 shows a cross-sectional view of the sealing bellows 242 which is produced from a rubber-elastic material. A recess 248 in the form of a groove is formed on the inside of an upper edge 243 of this sealing bellows. This groove 248 likewise runs in a radially surrounding fashion, complementary to the raised portion 246. The upper edge 243 of the sealing bellows 242 is provided for a contact engagement with the joint housing of the ball joint 1 (FIG. 1), whereas the lower edge 244 of the sealing bellows 242 in the form of a so-called bellows mouth serves to sealingly engage the ball stud 206, with both rotational rotary motions of the ball stud and tilting motions of the ball stud about its longitudinal axis being possible here.

Figure 8:
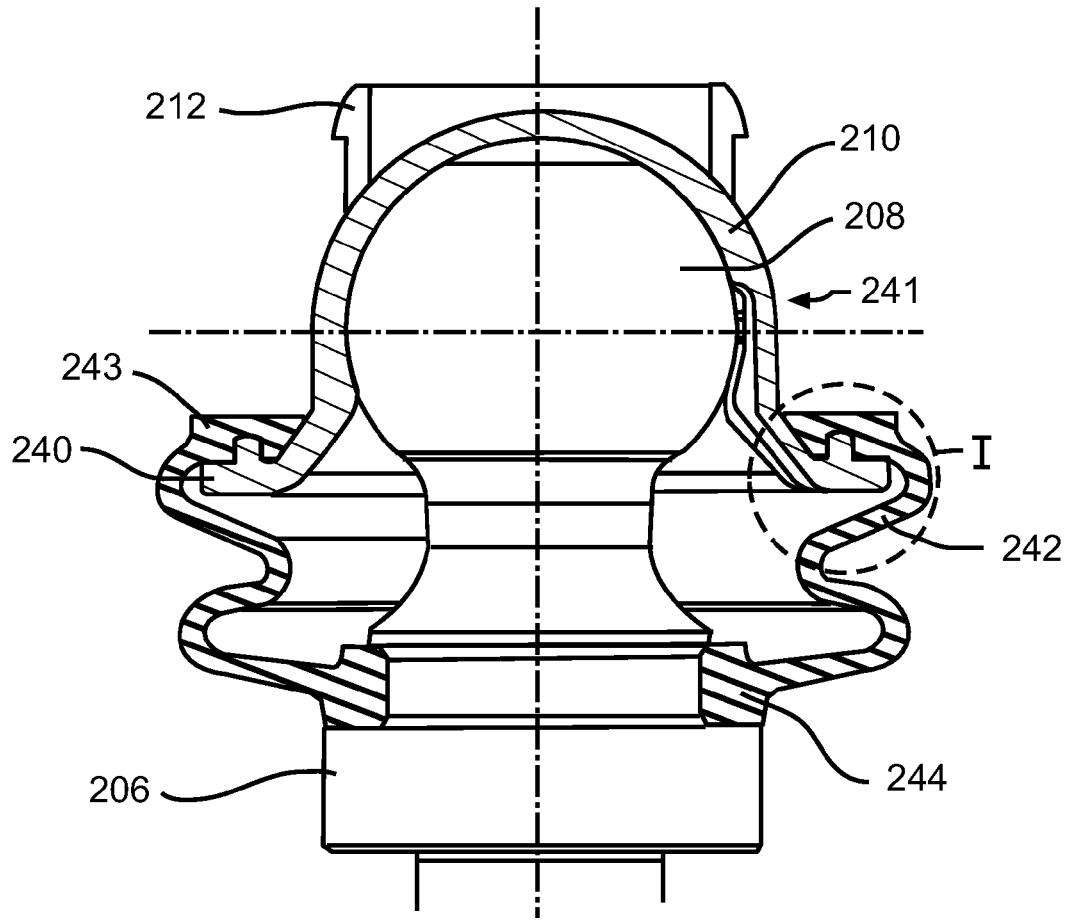
FIG. 8 shows a cross-sectional view of a bearing and sealing assembly for use in a ball joint of FIG. 1, the sealing bellows of FIG. 7 being attached to a holding flange of the joint socket of FIG. 6.

Using the joint socket 210 (FIG. 6) and the sealing bellows 242 (FIG. 7), a so-called subassembly 241 can be provided by suitably fastening the sealing bellows 242 to the holding flange 240. To this end, the groove 248 is linked with the raised portion 246. The subassembly consisting of the joint socket 210 and the sealing bellows 242 can subsequently be connected with a ball stud 206 in that a ball head 208 of the ball stud 206 is inserted through the opening 211 of the joint socket 210 and is thereby locked into the joint socket 210. Deviating from this, it is also possible to first fit the ball head of the ball stud into the joint socket and to lock it therein before the joint socket and the sealing bellows are connected with each other to form the subassembly 241. When the joint socket 210 is manufactured from a plastic material, it is sufficiently elastic, so that the locking of the ball head 208 is possible as a result of a slight widening or expansion of the joint socket. FIG. 8 shows a cross-sectional view of such a preassembled unit, in which the subassembly consisting of the joint socket 210 and the sealing bellows 242 is already connected with the ball stud 206. It can be seen that the lower edge 244 of the sealing bellows 242 is in sealing contact with the ball stud 206 and therefore ensures a reliable seal on the stud side.

Figure 9:
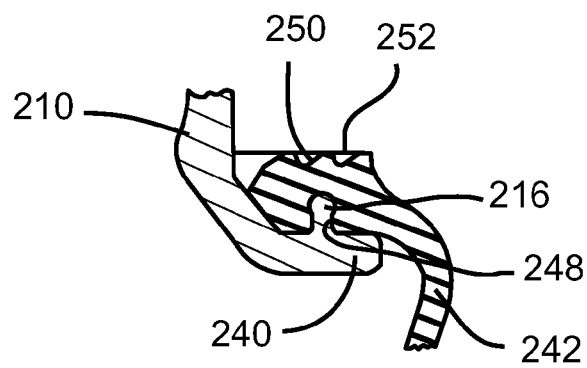
FIG. 9 shows the region I of FIG. 8 in an enlarged view.

FIG. 9 shows the region 201 of FIG. 8 in an enlarged illustration, namely the linking of the groove 248 with the raised portion 246. The raised portion 246 is of a crowned shape at its free end and thus forms an undercut. Owing to the elastic properties of the sealing bellows 242, the groove 248 can be readily applied onto the raised portion 246, so that the crowned end of the raised portion 246 is completely received within the groove 248. The undercut of the raised portion 246 thus leads to an interlocking connection with the sealing bellows 242. As a result, the sealing bellows 242 is thereby held both axially and radially at and on the holding flange 240 in a secured manner.

Figure 10:
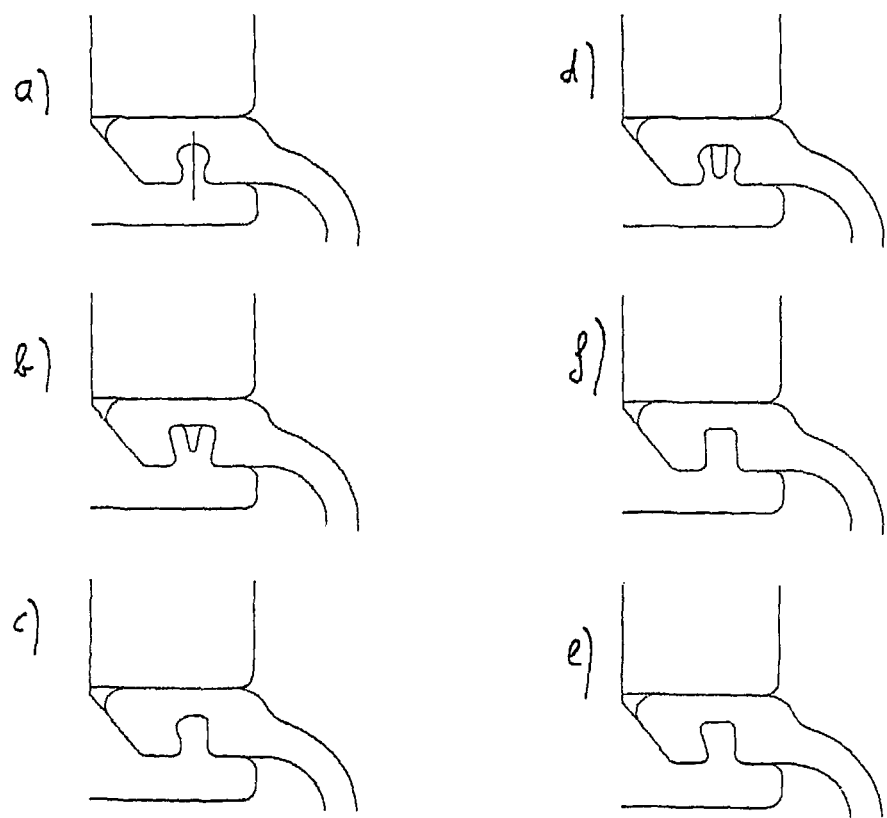
FIG. 10 shows illustrations simplified in terms of principle, for a linking of the sealing bellows of FIG. 7 with the holding flange of the joint socket of FIG. 6.

FIG. 10 shows further variants, simplified in terms of principle, for a configuration of the raised portion 246, the variants a) to e) all having an undercut and thus ensuring an interlocking connection between the sealing bellows and the holding flange both in the axial and in the radial direction. In the variant according to f), the connection between the sealing bellows and the holding flange may be additionally designed with a force fit, for example by the use of an adhesive or the like, so that a fixing of the sealing bellows both in the axial and in the radial direction is ensured for this variant as well. Moreover, the use of adhesive or the like is also possible for the variants a) to e) to achieve a supplementary force-fitting connection between the sealing bellows 242 and the holding flange 240.

In FIG. 9 it can be seen that a sealing rib structure 250 is formed on the sealing bellows 242 on its side opposite to the groove 248. This sealing rib structure 250 defines a contact surface 252 which is clamped with a joint housing 202 when the ball joint 201 is assembled, as will be discussed in detail further below.

Figure 11:
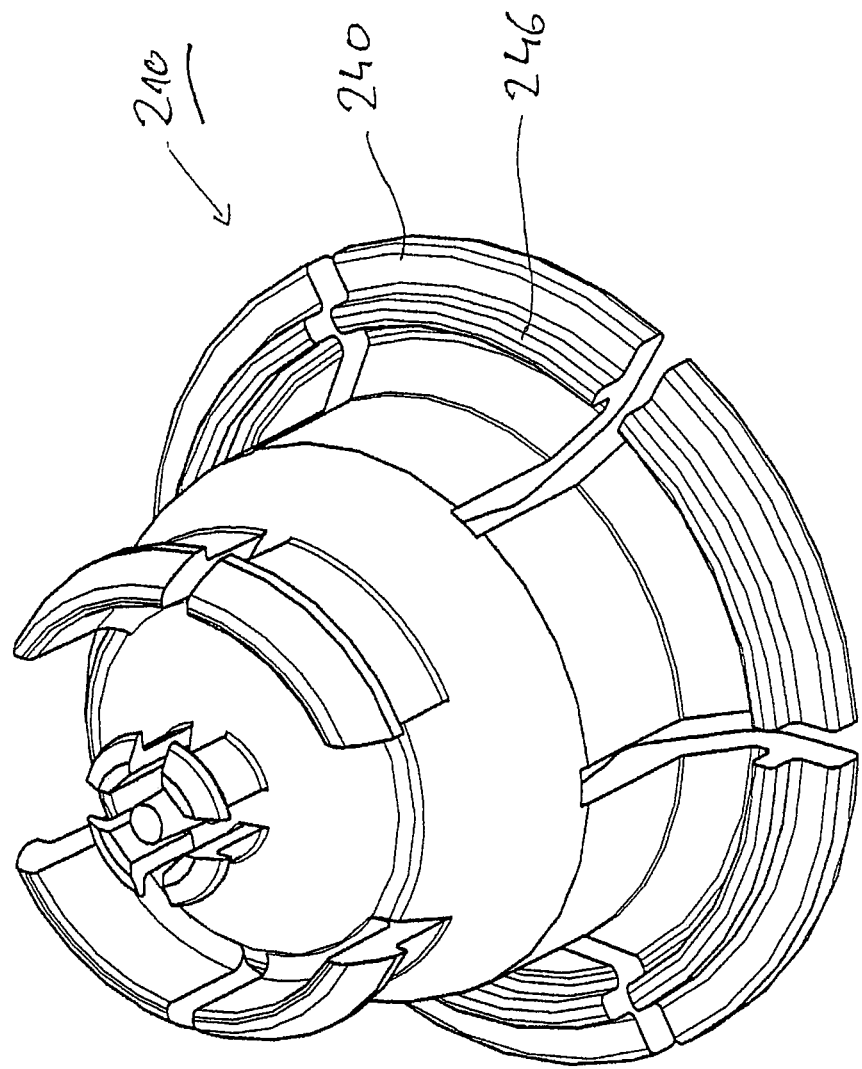
FIGS. 11 to 13 show perspective views of further embodiments of a joint socket.
Figure 11A:
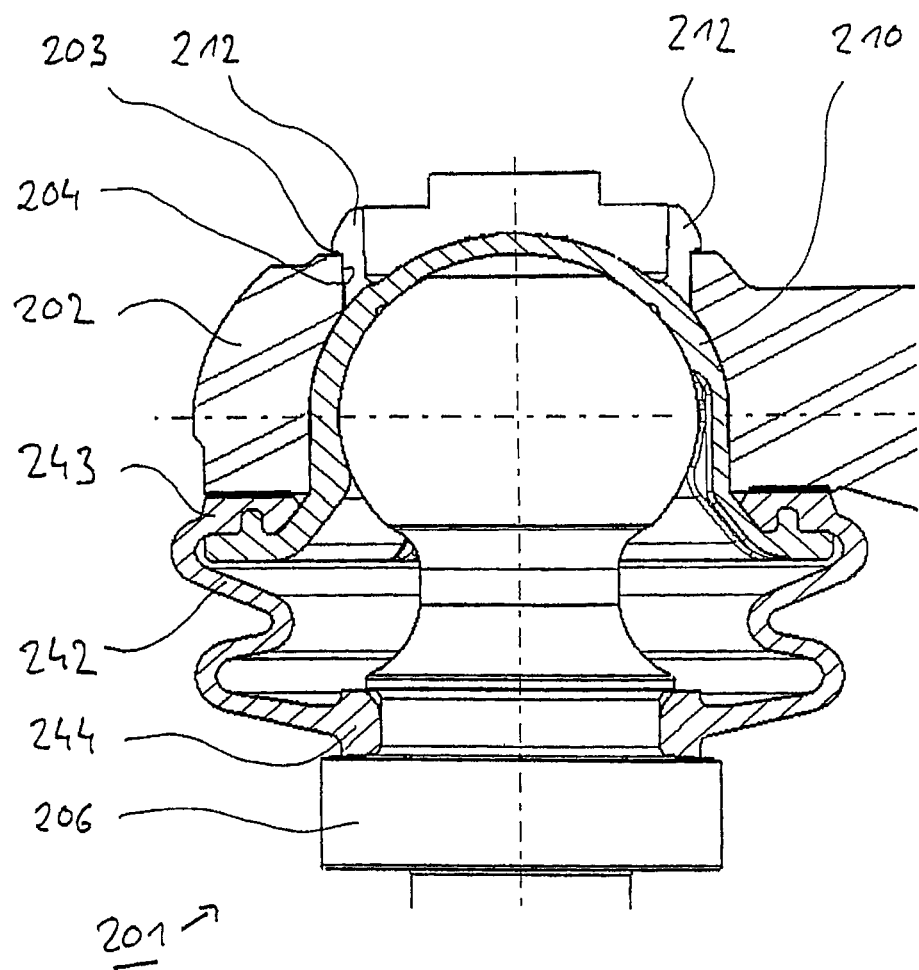
FIG. 11a shows a cross-sectional view of a ball joint in a fully assembled condition, according to a further embodiment of the invention.

FIG. 11a shows a cross-sectional view of a fully assembled ball joint 201 (by analogy with the illustration of FIG. 1), the joint socket 210 now being inserted in the recess 204 of the joint housing 202. The joint socket 210 is captively locked in place within the recess 204 by means of the snap hooks 212 which lock with a rim portion 203 of the recess 204. The axial height of the joint socket 210 is suitably dimensioned here such that in the installed condition, the sealing rib structure 250 of the sealing bellows 242 is pressed against the joint housing 202 from below. In conjunction with the linking of the groove 248 on the raised portion 246, this results in a particularly high tightness of the sealing bellows 242 at its upper edge 243, that is, the seal on the housing side.

The process of assembling the ball joint 201 shown in FIG. 11a (or FIG. 1) is carried out in such a way that at first the subassembly consisting of the sealing bellows 242 and the joint socket 210 is formed by the interlocking and/or force-fitting connection of these two elements. In a next step, the ball stud 206 is then inserted into the joint socket 210 and locked in place therein (cf. FIG. 8). As already discussed above, the ball stud can be inserted by its ball head into the joint socket and be locked in place with it before or also after forming the subassembly, which consists of the sealing bellows and the joint socket, in order to thereby form the above-mentioned preassembled unit. Subsequently, in a last step the preassembled unit, consisting of the ball stud, the joint socket and the sealing bellows, is connected with the joint housing 202 in that the joint socket 210 is inserted into the recess 204 of the joint housing 202 and is locked therein, as discussed above.

Figure 12:
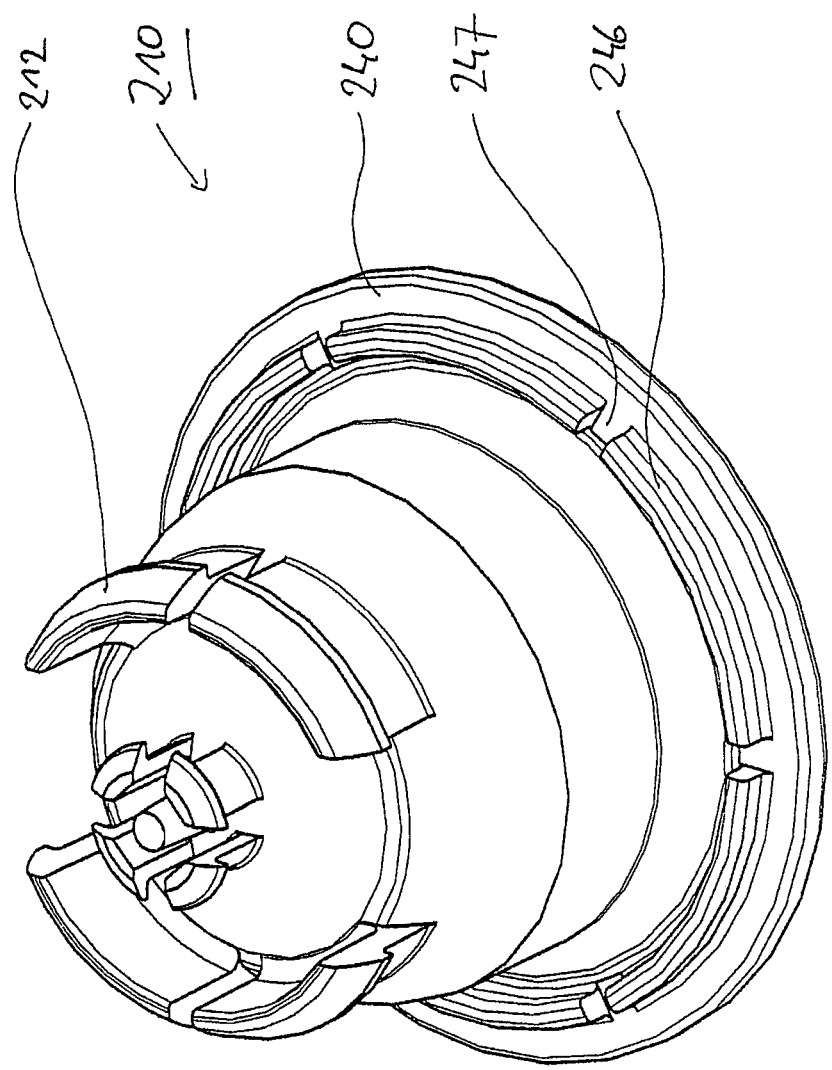
Figure 13:
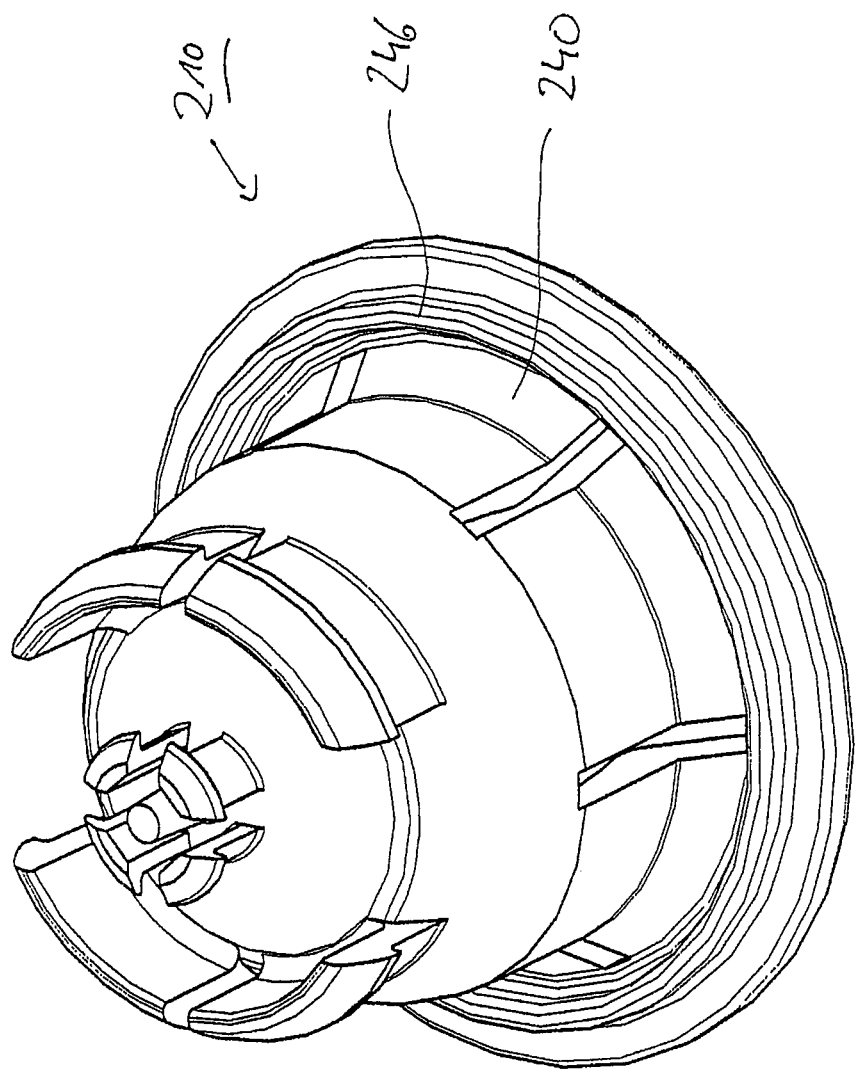

FIGS. 11 to 13 show alternative embodiments for the joint socket 210, each in a perspective view, modified as compared to the embodiment shown in FIG. 6. In the variant according to FIG. 11, both the holding flange 240 and the raised portion 246 have a segment-like or slotted configuration, which leads to an improved elasticity of the joint socket when it is locked with the ball head 206 and results in a simplification of production as a consequence of an improved removability from the mold. In the variant of FIG. 12, only the raised portion 246 is of a segment-type design with intermediate gaps 247. In the variant of FIG. 13, solely the holding flange 240, by an adjacent lower region of the joint socket 210, is of a slotted design, with the raised portion 246 being of a radially surrounding configuration.

Figure 14:
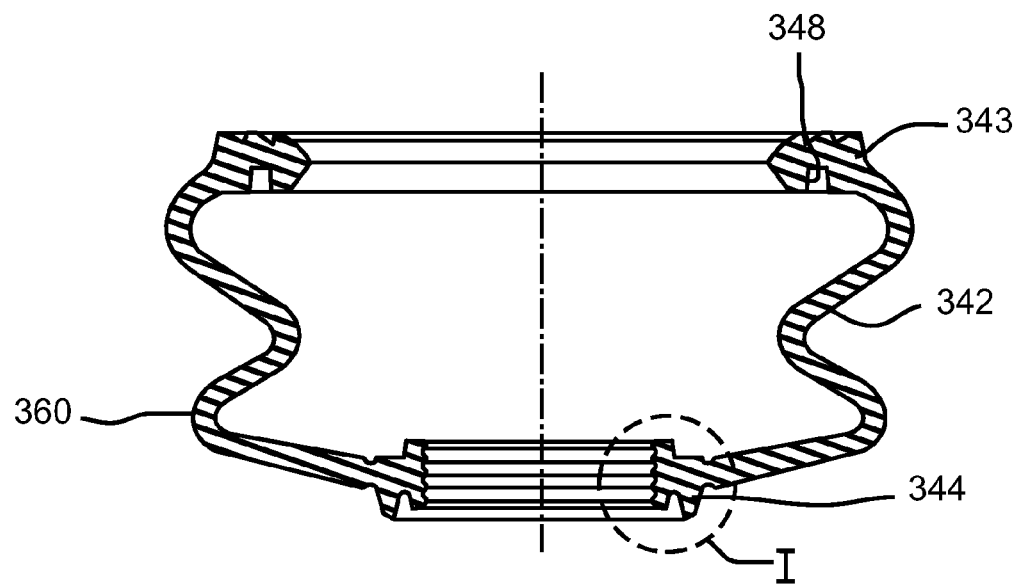
FIG. 14 shows a further cross-sectional view of the sealing bellows of FIG. 7.

FIG. 14 shows a cross-sectional view of a sealing bellows 342 which is provided for use in the ball joint 1 of FIG. 1 or the ball joint 201 of FIG. 11a. The sealing bellows 342 includes an upper edge 343 and a lower edge 344 in the form of a so-called bellows mouth. The sealing bellows 342 comprises a bellows body 360 which extends between the upper edge 343 and the bellows mouth 344. The upper edge 343 fulfils the purpose of a seal on the housing side and, with a ball joint in the assembled state, appropriately rests against the joint housing. The bellows mouth 344 fulfils the purpose of a seal on the stud side and rests against a ball stud in an appropriately sealing manner.

Figure 15:
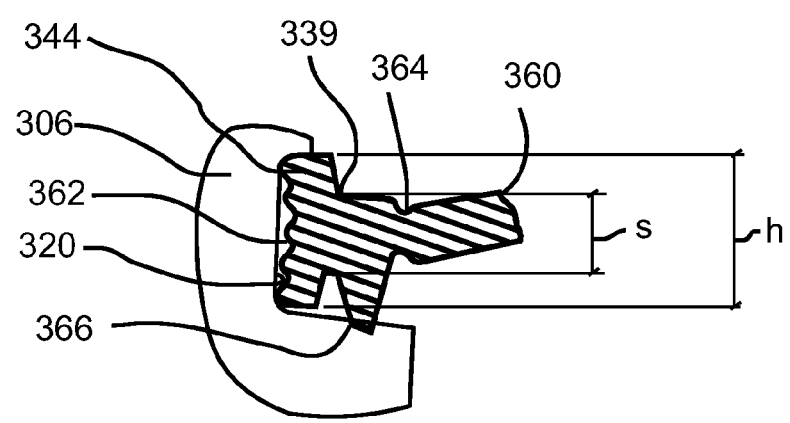
FIG. 15 shows the region I of FIG. 14 in an enlarged illustration.

The bellows mouth 344 has an inner circumferential surface 362 of a concave shape. FIG. 15 shows the region I of FIG. 14 in an enlarged illustration. The bellows mouth 344 is illustrated herein with its concave inner circumferential surface 362 in the non-loaded condition. FIG. 15 additionally shows, simplified as regards the principle, part of a ball stud 306 with a bellows groove 320, the bellows mouth 344 being inserted in this bellows groove 320. When the sealing bellows 342 is mounted in the ball joint, the inner circumferential surface 362 lies completely against the straight surface of the bellows groove 320, the bellows mouth 344 developing a spring action owing to its concave contact geometry. This results in any tensile or compressive forces in the bellows body, which may be generated in the case of large angles of movement of a ball stud, being compensated for, which ensures a uniform contact pressure and sealing performance over an axial height of the bellows mouth 344 or over its inner circumferential surface 362.

The illustration of FIG. 15 clearly shows that the bellows body 360 is connected with the bellows mouth 344 in such a way that a transition region 339 between the bellows body 360 and the bellows mouth 344 exhibits a reduced cross-section. This reduction of cross-section is produced in that the connecting portion between the bellows body 360 and the bellows mouth 344 has a smaller extent s than the axial height h of the bellows mouth 344. This ensures that any tensile forces or compressive forces, which are produced in the bellows body 360 in the case of large swivel angles of the ball stud 306 relative to a longitudinal axis 301 of the ball joint 300, are kept away from the bellows mouth 344 to the greatest possible extent. As a result, the contact pressure of the bellows mouth against the ball stud 306 is uniformly maintained over the height of the inner circumferential surface 362. This prevents the inner circumferential surface 362 from being detached from the bellows groove 320 on one side.

This reduction in transmission of force and motion between the bellows body and the bellows mouth as discussed above is further improved in that the bellows body 360 is fitted to the bellows mouth 344 essentially in the region of the axial center thereof. A still further improvement is achieved in that the bellows body has at least one indentation 364. The indentation 364 shown in FIG. 15 is shaped to be radially surrounding in the form of a groove. As an alternative, it is also possible to provide this indentation only on one side of the bellows body 360.

The sealing bellows 342 allows a fitting to the ball stud 306 also without a clamping ring being provided. The interaction of the different above-mentioned features of the sealing bellows 342, namely the spring action of the concave inner circumferential surface 362 and the reduction in force and motion transmission between the bellows body 360 and the bellows mouth 344, ensure a sufficient contact pressure for the bellows mouth 344, even if the ball joint 1 (FIG. 1) is subject to large angles of movement.

Figure 16:
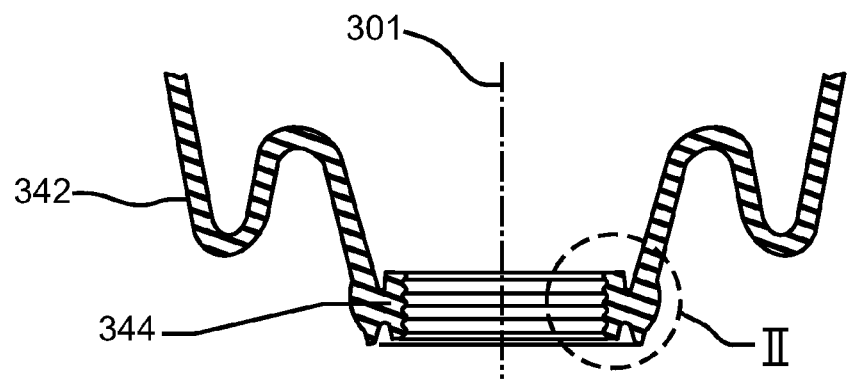
FIG. 16 shows a cross-sectional view of a part of a sealing bellows according to a further embodiment.

FIG. 16 is a cross-sectional view of part of a sealing bellows 342 with an axial fold. The axial fold is produced by a plurality of segments of the bellows body 360 which run in the radial direction and have different axial heights.

Figure 17:
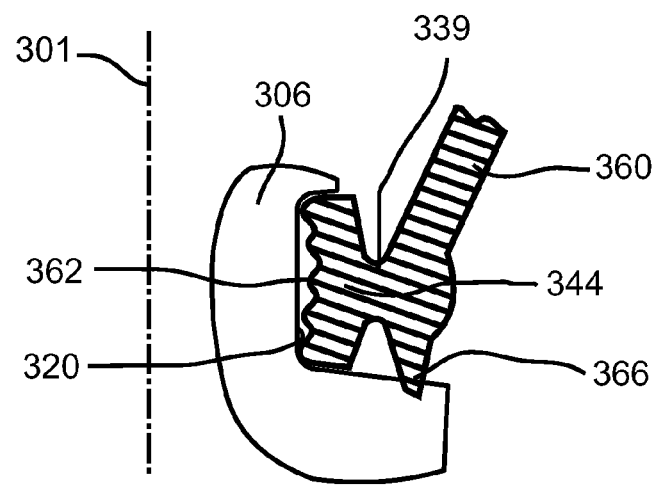
FIG. 17 shows the region II of FIG. 16 in an enlarged illustration.

FIG. 17 shows a cross-sectional view of the region II of FIG. 16. It can be seen herein that due to the axial fold (FIG. 16), the bellows body 360 adjacent to the bellows mouth 344 includes a smaller angle with the longitudinal axis 301 of the ball joint than in the embodiment of FIG. 15. But the reduction in the force and motion transmission as discussed above is also ensured in the embodiment of FIG. 17 as a result of the connection between the bellows body 360 and the bellows mouth 344, which features a reduction of cross-section in the transition region 339 between these two elements. In the same way as in FIG. 15, FIG. 17 shows the bellows mouth 344 with its originally concave inner circumferential surface 362 which lies against the bellows groove 320 in a straight line when the assembly of the ball joint has been completed.

Figure 18:
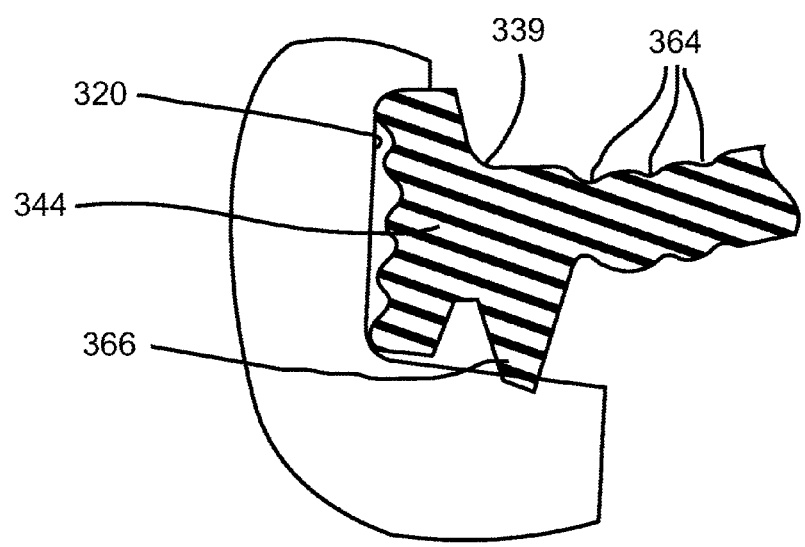
FIG. 18 shows a cross-sectional view of a part of a sealing bellows according to a further embodiment.

For an improved reduction in the transmission of force and motion between the bellows body and the bellows mouth, a plurality of indentations 364 may be formed one behind the other in the bellows body 360, the indentations 364 being arranged adjacent to each other in a row. FIG. 18 shows a cross-sectional view of a lower portion of the bellows body 360, which is adjacent to the bellows mouth 344. In this embodiment provision is made for three indentations. It will be appreciated that when a plurality of indentations is provided, their number is not limited to three, but may also be higher or lower.

Both in the embodiment according to FIG. 15 and in the embodiment according to FIG. 18, the sealing bellows 342 includes a wiper lip 366 which is formed radially outside the transition region 339 between the bellows body 360 and the bellows mouth 344. The wiper lip 366 defines an axial extension of the bellows body 360 and is in contact with an edge portion of the bellows groove 320. The wiper lip 366 protects the ball joint 301 from the ingress of dirt and/or moisture.

Figure 19:
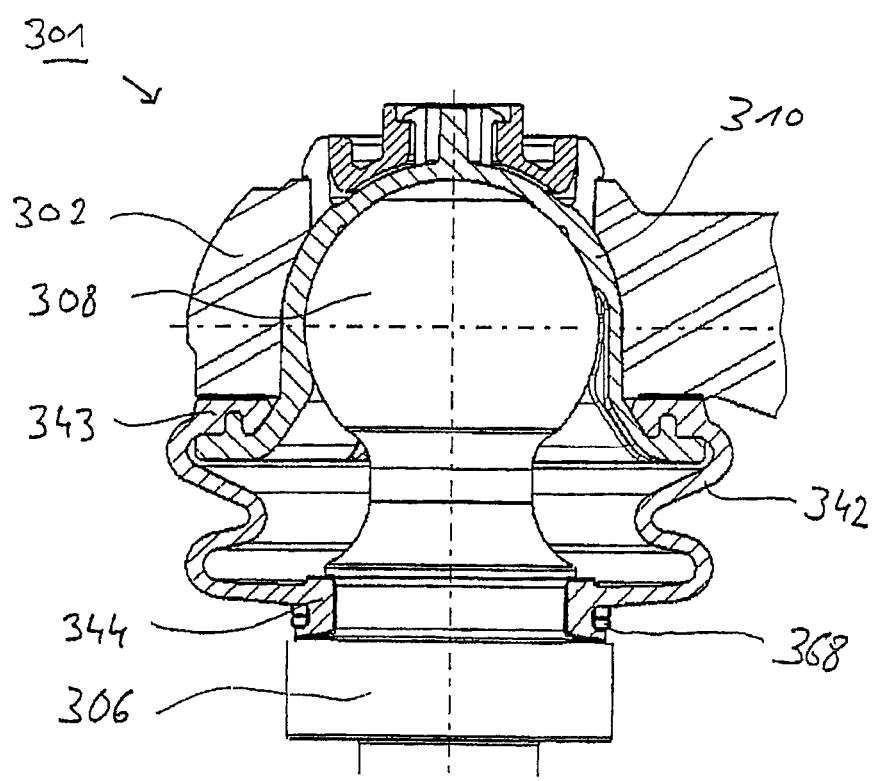
FIG. 19 shows a cross-sectional view of a ball joint with a sealing bellows according to a further embodiment.

FIG. 19 shows the ball joint 301 with a further embodiment of the sealing bellows 342, a clamping ring 368 being made use of for additionally fixing the bellows mouth 344 in place in the bellows groove 320. But the properties and features of the sealing bellows 342 according to the embodiments discussed above are maintained unchanged in the presence of such a clamping ring 368 as well.

FIGS. 20 to 24 show a strut body 470 in conjunction with details thereof, by means of which two ball joints 1 can be combined or connected to form a system of ball joints. In other words, the respective ends of such a strut body 470 each have a ball joint according to the above-discussed embodiments fitted thereto.

Figure 20:
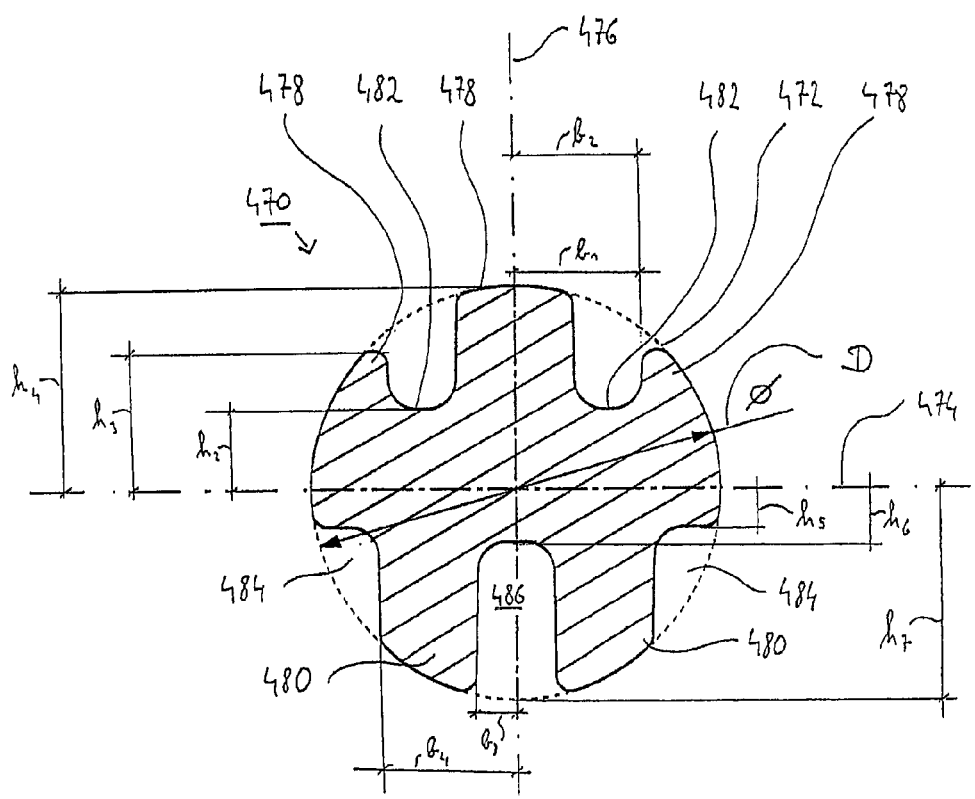
FIG. 20 shows a cross-sectional view of a strut body in a plane substantially orthogonal to its longitudinal axis.
Figure 21:
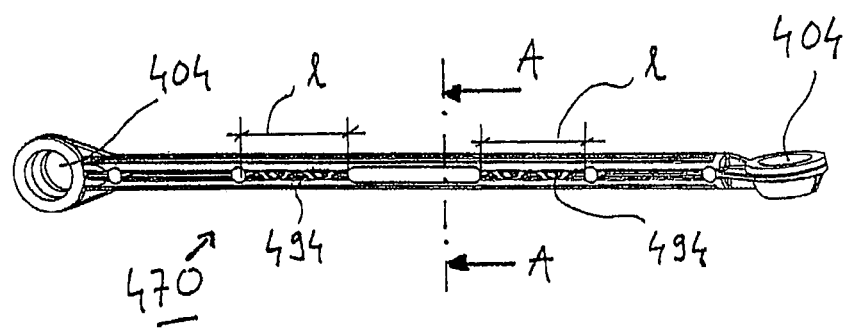
FIG. 21 shows a perspective view of the strut body of FIG. 20.

FIG. 20 and FIG. 21 show the strut body 470, FIG. 21 representing a perspective view and FIG. 20 representing a cross-sectional view along the line A-A of FIG. 21.

The strut body 470 has a profile cross-section which is arranged within an enveloping circle 472 having the diameter D (FIG. 20). The strut body 470 has a horizontal axis 474 and a vertical axis 476. Three raised portions 478 are formed above the horizontal axis 474 and two raised portions 480 are formed below the horizontal axis. The strut body 470 is designed symmetrically with respect to its vertical axis 476, its center of area S being located above the horizontal axis 474 and being spaced apart from it by the distance $h_1$.

In respect of its profile cross-section, the strut body 470 is characterized by the respective dimensions of the individual raised portions 478, 480 and the profile depressions 482, 484 and 486 formed in between. The dimensions of these raised portions and profile depressions are defined in FIG. 1 by the distances $h_2$ to $h_7$ and $b_1$ to $b_4$, respectively. Depending on the purpose of use of the strut body 470 or a loading condition occurring, the heights $h_1$ to $h_7$ and/or the widths $b_1$ to $b_4$ of the raised portions may be made to be constant or variable along a length of the strut body 470.

Figure 22:
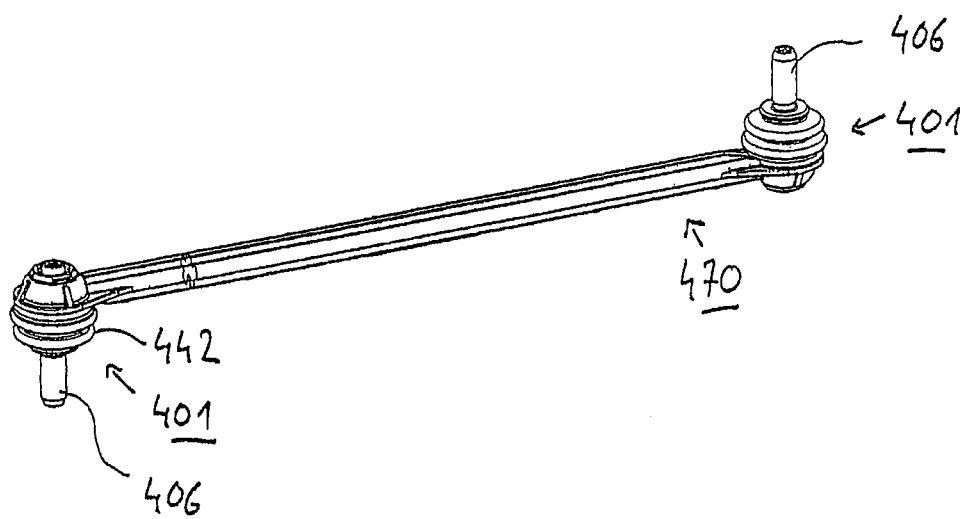
FIG. 22 shows a perspective view of the strut body of FIG. 21, both free ends of which each having a ball joint according to FIG. 1 mounted thereon.

FIG. 22 shows the strut body 470 of FIG. 21, with a ball joint 400 mounted to each of the two ends. Such a ball joint 400 typically consists of a ball stud 406, a sealing bellows 442 and a joint socket (not visible). A recess 404 in the form of a passage opening is formed on each of the two ends of the strut body 470. The joint socket within which the ball stud 306 is accommodated for swiveling motion is inserted into the respective passage openings 404 of the strut body 470 and is captively locked therein for completion of the assembled stabilizer strut shown in FIG. 22.

Figure 23:
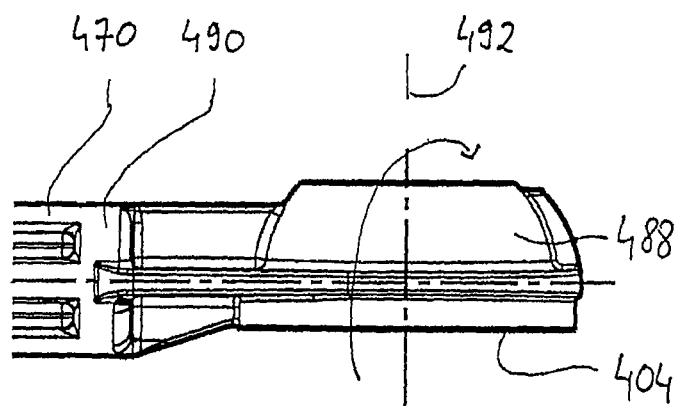
FIG. 23 shows the region I of FIG. 2 in an enlarged illustration.

FIG. 23 shows an end portion of the strut body 470 corresponding to the region I of FIG. 22 in an enlarged illustration. The passage opening 404 here forms a connection region 488 to receive a ball joint 300. A transition region 490 having a cylindrical configuration is provided between the connection region 488 and an adjoining edge portion of the strut body 470. Owing to this cylindrical portion, the connection region 488, i.e. the passage opening 404, can be arranged with its axis 492 extending in the longitudinal direction of the opening in a defined angle in relation to the strut body 470, taking into consideration the direction of its removal from the mold.

For a further improvement of its stiffness, the strut body is reinforced by ribs 494 on its outer surface at its profile depressions, each of the ribs being formed thereon over a lengthwise portion 1.

Figure 24:
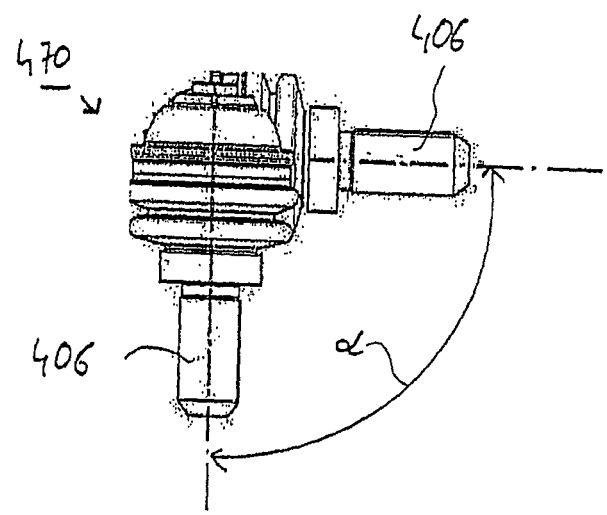
FIG. 24 shows the strut body of FIG. 22 in an end view, the ball studs of the two ball joints including an angle of 90° in relation to each other.
Figure 25:
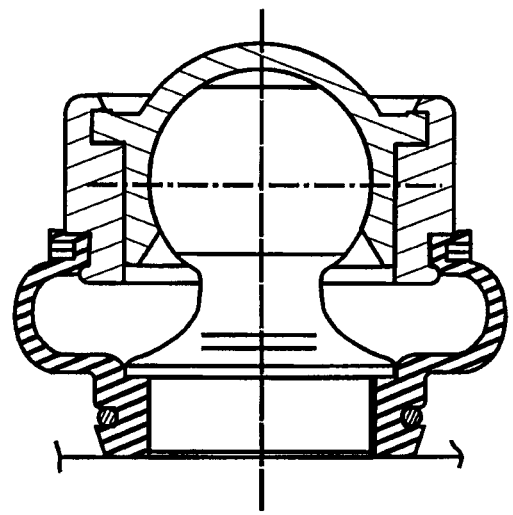
FIGS. 25 to 38 each show ball joints or individual parts thereof according to the prior art.
Figure 34:
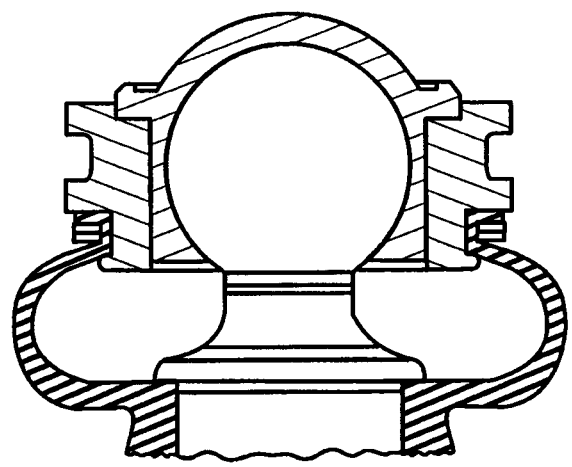
Figure 26:
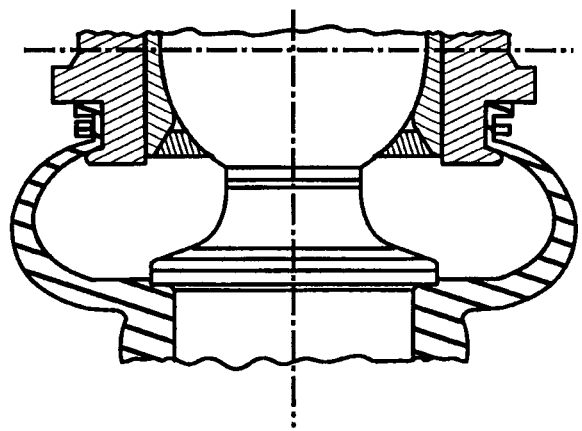
Figure 27:
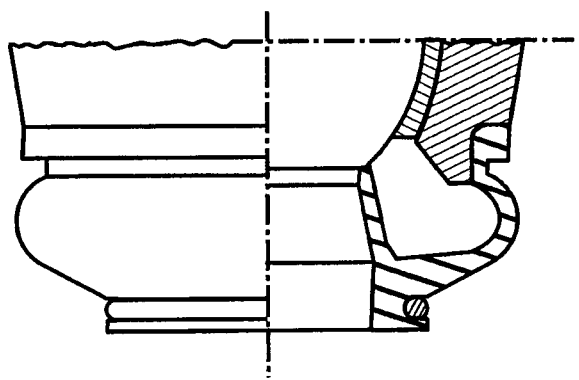
Figure 28:
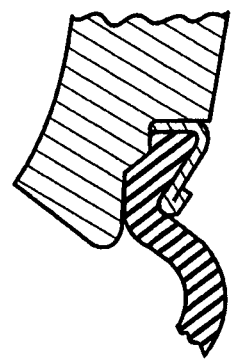
Figure 29:
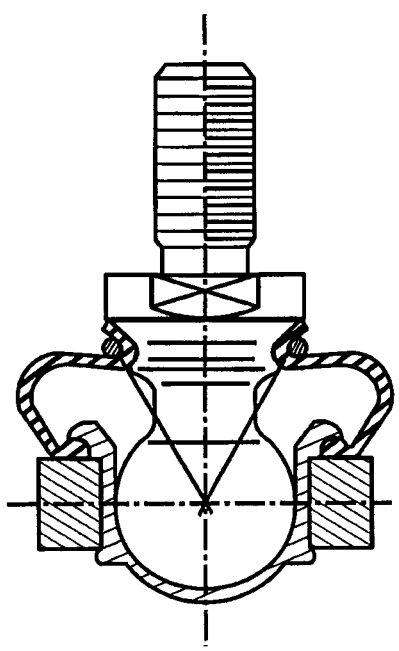
Figure 30:
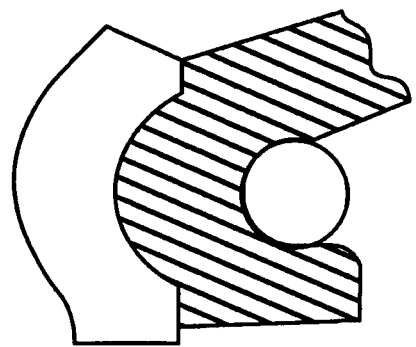
Figure 31:
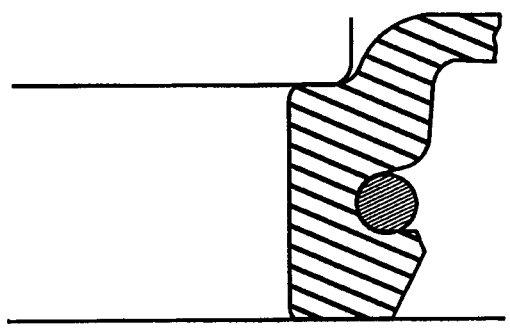
Figure 32:
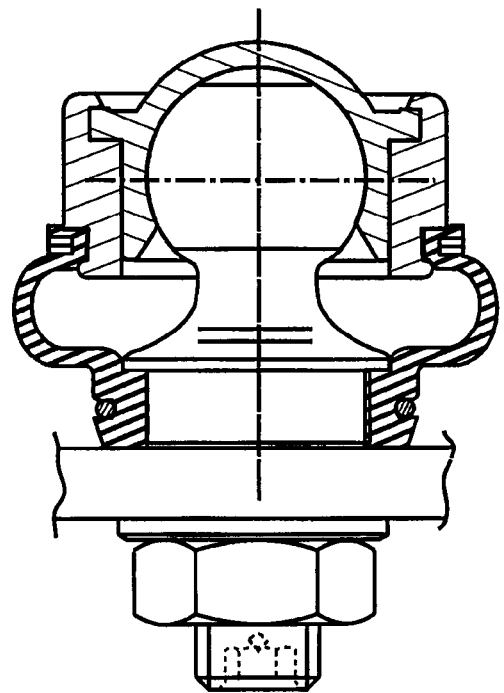
Figure 33:
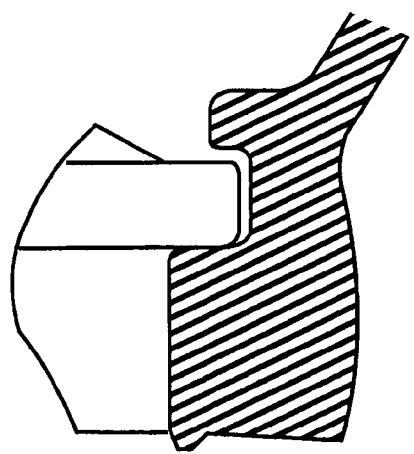
Figure 35:
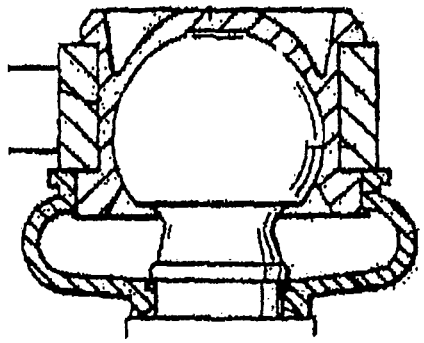
Figure 36:
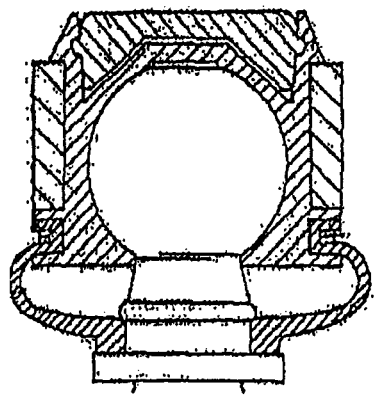
Figure 37:
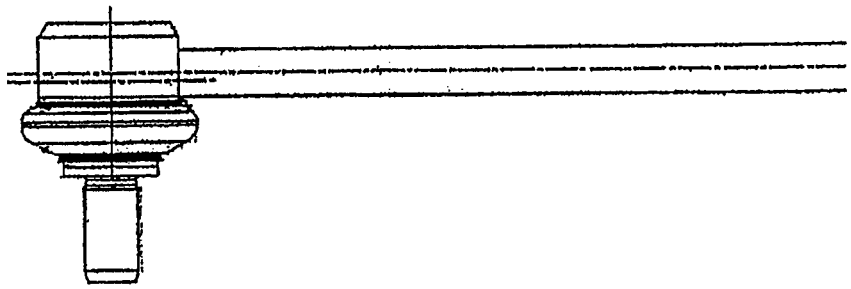
Figure 38:
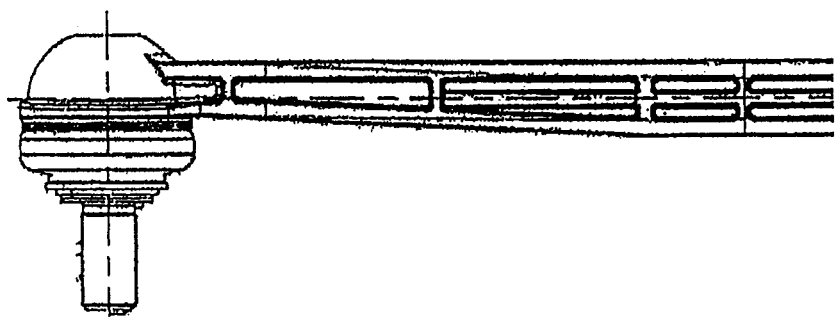

FIG. 24 shows a top view of a front face of the strut body 470 when the two ball studs 406 of the respective ball joints 401 include an angle of 90° in relation to each other by their respective longitudinal axis. In respect of the embodiment shown in FIG. 22, it is true that the two ball studs 406 include an angle of 180° in relation to each other. Generally, it is applicable that by suitably designing the transition region 490 when manufacturing the strut body 470, all relative angular orientations in a range from 0° to 180° are possible for the connection regions 488 at the two ends of the strut body 470, so that the ball studs of ball joints mounted thereto include an angle in relation to each other in the above-mentioned range. Accordingly, a large variety of applications of the strut body 470 in the chassis area or comparable fields is ensured. With respect to the strut body 470, it will be appreciated that such a structural element is generally suitable for connecting two points. In other words, the use of such a strut body is also possible without ball joints; in this case, provision is respectively made for other bodies at the two ends of the strut body, which are mechanically connected with each other by the strut body. In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A ball joint, comprising
a joint housing having a recess,
a ball stud having a ball head,
a sealing bellows having a sealing seat on the housing side and a sealing seat on the stud side in the form of a bellows mouth which is adapted to be brought into contact with the ball stud, a bellows body of the sealing bellows extending between the sealing seat on the housing side and the bellows mouth,
a joint socket, the ball head being accommodated for swiveling motion within the joint socket, and the joint socket being inserted in the recess of the joint housing,
at least one locking member which is arranged on an outside of the joint socket opposite to the ball head and cooperates with a rim of the recess of the joint housing, and
a retaining member which, in the assembled condition of the ball joint, is in contact with an inner circumferential surface of the at least one locking member so that the at least one locking member is thereby held in engagement with the rim of the recess of the joint housing and the joint socket is captively secured in the recess of the joint housing, the retaining member being connected with the joint socket in a pole portion thereof wherein the retaining member has a central recess, the recess having a locking surface defining a shoulder,
wherein the joint socket includes a projecting fastening pin in the pole portion, the fastening pin being formed as a snap hook having undercuts which are configured to be brought into engagement the shoulder of the recess of the retaining member such that the retaining member is connected with an interlocking fit with the joint socket in the pole portion thereof.

2. The ball joint according to claim 1, wherein the retaining member is connected with the joint socket with an interlocking fit and/or by a substance-to-substance bond.

3. The ball joint according to claim 1, wherein the joint socket is manufactured from plastic in one piece.

4. The ball joint according to claim 1, wherein the joint socket has a closed shell surface.

5. The ball joint according to claim 4, wherein the closed shell surface is provided in the pole portion in which the joint socket is connected with the retaining member.

6. The ball joint according to claim 1, wherein after a mounting of the retaining member, the fastening pin can be reshaped on its free end such that the retaining member is secured in position with an interlocking fit.

7. The ball joint according to claim 6, wherein the fastening pin is formed as a hollow cylinder.

8. The ball joint according to claim 1, wherein the fastening pin is connected in the recess of the retaining member by a substance-to-substance bond.

9. The ball joint according to claim 8, wherein the substance-to-substance bond between the fastening pin and the recess of the retaining member is effected by ultrasonic welding.

10. The ball joint according to claim 1, wherein an outer edge of the retaining member is connected with the inner circumferential surface of the at least one locking member by a substance-to-substance bond.

11. The ball joint according to claim 1, wherein the retaining member is formed as a pole cap.

12. The ball joint according to claim 1, wherein the joint socket includes a holding flange and the sealing bellows is fastened to the holding flange, a raised portion being formed on the holding flange and a recess being formed in an edge portion of the sealing bellows, the recess of the sealing bellows and the raised portion of the holding flange being linked with each other.

13. The ball joint according to claim 12, wherein the holding flange is formed in a radially surrounding manner or in segments.

14. The ball joint according to claim 12, wherein the sealing bellows is fastened to the holding flange with an interlocking fit and/or with a force fit.

15. The ball joint according to claim 14, wherein on a side opposite to the recess, the sealing bellows includes a contact surface that is in contact with the joint housing and has a sealing rib structure formed thereon.

16. The ball joint according to claim 15, wherein the bellows mouth is adapted to be brought into sealing contact with the ball stud with a substantially constant contact pressure in different angular positions of the ball stud with respect to a longitudinal axis of the ball joint.

17. The ball joint according to claim 16, wherein the contact surface of the bellows mouth which comes into contact with the ball stud has a concave shape in the unloaded condition so that a resilient contact engagement of the bellows mouth with the ball stud is produced.

18. The ball joint according to claim 16, wherein an axial wiper lip is formed on the bellows body in a region opposite to the contact surface contacting the ball stud.

19. The ball joint according to claim 18, wherein the bellows body and the bellows mouth are connected with each other in such a way that a force and motion transmission between these elements is reduced.

20. The ball joint according to claim 19, wherein the bellows body is fitted to the bellows mouth essentially in the region of an axial center thereof, so that the reduction in the force and motion transmission between the bellows body and the bellows mouth is produced thereby.

21. The ball joint according to claim 19, wherein a transition region between the bellows body and the bellows mouth has a reduced cross-section.

22. The ball joint according to claim 21, wherein the wiper lip is provided radially outside with respect to the reduction of cross-section.

23. The ball joint according to claim 21, wherein the bellows body has at least one indentation.

24. The ball joint according to claim 23, wherein the indentation in the bellows body is formed on one side or on both sides.

25. The ball joint according to claim 23, wherein the bellows body has a plurality of indentations.

26. The ball joint according to claim 23, wherein the at least one indentation is provided in a region of the bellows body adjacent to the bellows mouth.

27. The ball joint according to claim 23, wherein the at least one indentation is provided radially outside of the reduction of cross-section between the bellows mouth and the bellows body.

28. The ball joint according to claim 12, wherein the raised portion has an undercut.

29. The ball joint according to claim 28, wherein the undercut is of a spherical, crowned or angled shape.

30. The ball joint according to claim 1, which is mechanically connected with a further ball joint by a strut body having a profile cross-section which is arranged within an enveloping circle and has a vertical axis and a horizontal axis, a first number of raised portions being formed above the horizontal axis of the profile cross-section and a second number of raised portions being formed below the horizontal axis of the profile cross-section, the first number being greater than the second number.

31. The ball joint according to claim 30, wherein three raised portions are formed above the horizontal axis and two raised portions are formed below the horizontal axis.

32. The ball joint according to claim 30, wherein the profile cross-section is symmetrical with respect to the vertical axis.

33. The ball joint according to claim 30, wherein the profile cross-section is substantially constant along a length of the strut body.

34. The ball joint according to claim 30, wherein the profile cross-section is variable along a longitudinal extent of the strut body.

35. The ball joint according to claim 30, wherein a center of area of the strut body is constant with respect to the strut body position in relation to the horizontal axis.

36. The ball joint according to claim 30, wherein a center of area of the strut body is variable with respect to the strut body position in relation to the horizontal axis, so that the bending line of the strut body is suitably adapted to an external load.

37. The ball joint according to claim 30, wherein at least one profile depression is provided on an outer surface between the raised portions.

38. The ball joint according to claim 37, wherein the at least one profile depression has a closed configuration.

39. The ball joint according to claim 37, wherein the at least one profile depression is stiffened by ribs at least in a longitudinal portion of the strut body.

40. The ball joint according to claim 30, wherein a transition region is provided on at least one free end of the strut body, the transition region constituting a connection region for a kinematic point.

41. The ball joint according to claim 40, wherein the transition region is formed as a cylindrical portion, so that the connection region is decoupled from the profile cross-section as regards its angular position.

42. The ball joint according to claim 40, wherein both free ends of the strut body each have a transition region provided thereon, the connection regions thereof including an angle between 0° and 180° relative to each other.

43. The ball joint according to claim 30, wherein the strut body is manufactured by means of aluminum die-casting.

44. The ball joint according to claim 1 wherein the retaining member includes an inner annular portion and an outer annular portion connected together by a body portion, the body portion being curved complimentary to an outer shell surface of the joint socket.

* * * * *